United States Patent [19]

Murayama

[11] Patent Number: 5,712,928
[45] Date of Patent: Jan. 27, 1998

[54] PICTURE ENCODING METHOD AND APPARATUS AND PICTURE DECODING METHOD AND APPARATUS

[75] Inventor: Jun Murayama, Tokyo, Japan

[73] Assignee: Sony Corporation, Tokyo, Japan

[21] Appl. No.: 568,560

[22] Filed: Dec. 7, 1995

[30] Foreign Application Priority Data

Dec. 12, 1994 [JP] Japan ................. 6-332600

[51] Int. Cl.⁶ .................................. G06K 9/36
[52] U.S. Cl. ........................... 382/242; 358/426
[58] Field of Search ................... 382/197, 199, 382/198, 200, 266, 190, 242, 232, 251, 253, 201; 358/425, 426, 261.1, 261.2, 261.3, 261.4; 348/125, 423

[56] References Cited

U.S. PATENT DOCUMENTS

| | | | |
|---|---|---|---|
| 3,863,218 | 1/1975 | Oka et al. | 340/146.3 AE |
| 4,628,532 | 12/1986 | Stone et al. | 382/21 |

FOREIGN PATENT DOCUMENTS

| | | | |
|---|---|---|---|
| 95334686 | 12/1995 | Japan | H04N 1/41 |
| 96167031 | 6/1996 | Japan | H04N 1/41 |

*Primary Examiner*—Thomas D. Lee
*Assistant Examiner*—Jerome Grant II
*Attorney, Agent, or Firm*—William S. Frommer; Alvin Sinderbrand

[57] ABSTRACT

In a picture encoding and decoding method and apparatus, an object contour can be chain coded precisely even in the case where noise exists in the vicinity of object contour, and the object contour branched off can be coded with small quantity of codes. In the case where the branched part occurs in a feature point chain, by multiplexing branch code D1 to chain codes S23 and S22 and expressing as a tree structured feature point chain including the branch part of the object contour, an increase in number of chains can be controlled and the efficient chain coding can be conducted. Moreover, since the terminal branch chains having no branch point in the chain become the objects of thresholding, only noise elements can be effectively eliminated without cutting off the feature point chain showing the object contours.

16 Claims, 21 Drawing Sheets

| ADDRESS (COUNTER OUTPUT) | CONTENTS OF SEARCH X-ROM | CONTENTS OF SEARCH Y-ROM | CONTENTS OF DIRECTION ROM |
|---|---|---|---|
| 0 | -1 | -1 | C0 |
| 1 | -1 | 0 | C1 |
| 2 | -1 | 1 | C2 |
| 3 | 0 | -1 | C3 |
| 4 | 0 | 1 | C4 |
| 5 | 1 | -1 | C5 |
| 6 | 1 | 0 | C6 |
| 7 | 1 | 1 | C7 |

FIG. 3 (RELATED ART)

| C0 | C1 | C2 |
|---|---|---|
| C3 | A | C4 |
| C5 | C6 | C7 |

FIG. 4 (RELATED ART)

| PREVIOUS DIREC-TION SIGNAL | DIRECTION SIGNAL | DIRECTION CHANGE SIGNAL |
|---|---|---|
| C0<br>C1<br>C2<br>C3<br>C4<br>C5<br>C6<br>C7 | C0<br>C1<br>C2<br>C3<br>C4<br>C5<br>C6<br>C7 | D0 |
| C0<br>C1<br>C2<br>C3<br>C4<br>C5<br>C6<br>C7 | C1<br>C2<br>C4<br>C0<br>C7<br>C3<br>C5<br>C6 | D1 |
| C0<br>C1<br>C2<br>C3<br>C4<br>C5<br>C6<br>C7 | C2<br>C4<br>C7<br>C1<br>C6<br>C0<br>C3<br>C5 | D2 |
| C0<br>C1<br>C2<br>C3<br>C4<br>C5<br>C6<br>C7 | C4<br>C7<br>C6<br>C2<br>C5<br>C1<br>C0<br>C3 | D3 |

FIG. 6 (RELATED ART)

| PREVIOUS DIREC-TION SIGNAL | DIRECTION SIGNAL | DIRECTION CHANGE SIGNAL |
|---|---|---|
| C0<br>C1<br>C2<br>C3<br>C4<br>C5<br>C6<br>C7 | C3<br>C0<br>C1<br>C5<br>C2<br>C6<br>C7<br>C4 | D4 |
| C0<br>C1<br>C2<br>C3<br>C4<br>C5<br>C6<br>C7 | C5<br>C3<br>C0<br>C6<br>C1<br>C7<br>C4<br>C2 | D5 |
| C0<br>C1<br>C2<br>C3<br>C4<br>C5<br>C6<br>C7 | C6<br>C5<br>C3<br>C7<br>C0<br>C4<br>C2<br>C1 | D6 |
| C0<br>C1<br>C2<br>C3<br>C4<br>C5<br>C6<br>C7 | C7<br>C6<br>C5<br>C4<br>C3<br>C2<br>C1<br>C0 | NO CODE |

FIG. 7 (RELATED ART)

| DIRECTION CHANGE SIGNAL | CODE WORD |
|---|---|
| D0 | 1 |
| D1 | 01 |
| D4 | 001 |
| D2 | 0001 |
| D5 | 00001 |
| D3 | 000001 |
| D6 | 0000001 |

FIG. 8 (RELATED ART)

| DIRECTION CHANGE SIGNAL | CODE WORD |
|---|---|
| D0 | 1 |
| D1 | 01 |
| D4 | 001 |
| D2 | 0001 |
| D5 | 00001 |
| D3 | 000001 |
| D6 | 0000001 |

| BRANCH SIGNAL | CODE WORD |
|---|---|
| BRANCH | 00000001 |

| CHAIN END SIGNAL | CODE WORD |
|---|---|
| END OF CHAIN | 000000001 |

FIG. 12

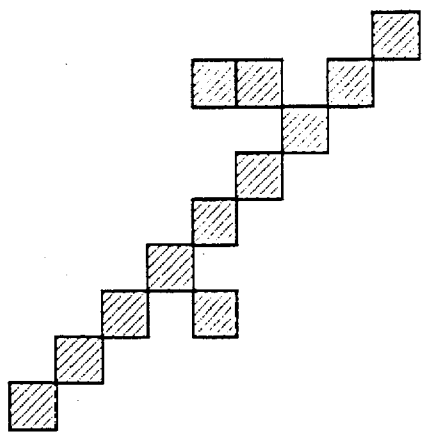
FIG. 16 A
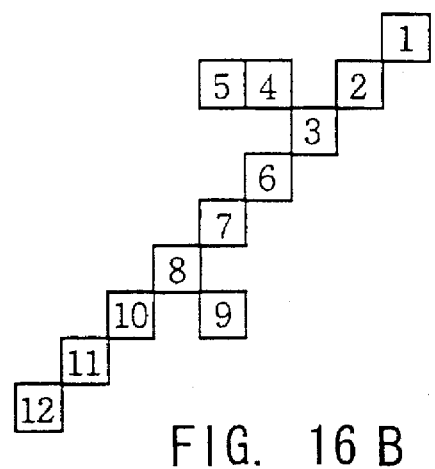
FIG. 16 B
| COORDI-NATE OF PIXEL 1 | PIXEL 2 | PIXEL 3 | BRANCH CODE | PIXEL 4 | PIXEL 5 | END OF CHAIN CODE | PIXEL 6 | PIXEL 7 |
| PIXEL 8 | BRANCH CODE | PIXEL 9 | END OF CHAIN CODE | PIXEL 10 | PIXEL 11 | PIXEL 12 | END OF CHAIN CODE |
D2
FIG. 16 C
| COORDI-NATE OF PIXEL 1 | PIXEL 2 | PIXEL 3 | PIXEL 6 | PIXEL 7 | PIXEL 8 | PIXEL 10 | PIXEL 11 | PIXEL 12 | END OF CHAIN CODE |
M2(B1)
FIG. 16 D
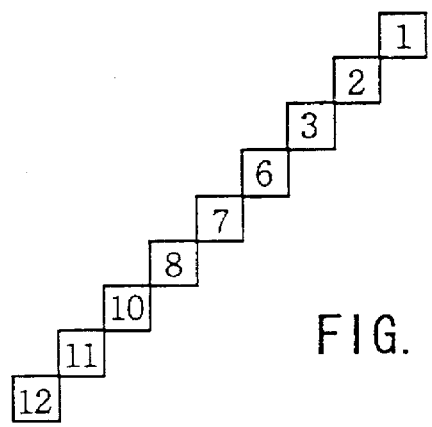
FIG. 16 E

| -0.25 | 0 | 0.25 |
|-------|---|------|
| -0.5  | 0 | 0.5  |
| -0.25 | 0 | 0.25 |

| -0.25 | -0.5 | -0.25 |
|-------|------|-------|
| 0     | 0    | 0     |
| 0.25  | 0.5  | 0.25  |

PICTURE ENCODING METHOD AND APPARATUS AND PICTURE DECODING METHOD AND APPARATUS

BACKGROUND OF THE INVENTION

1. Field of the Invention

This invention relates to a video signal coding apparatus and method, and a video signal decoding apparatus and method, and more particularly, relates to the video signal coding apparatus and method, and the video signal decoding apparatus and method which reduce the amount of generating code by detecting feature points of motion picture and chain coding the data of the feature points.

2. Description of the Related Art

Heretofore, in a system for transmitting a picture under the limited transmission band and a system for recording a picture in the recording media having the limited storage capacity, the low bit rate coding method to efficiently compress the picture data with fewer code is employed. As the method for coding video signal efficiently, a method in which input video signal is orthogonally transformed using DCT (Discrete Cosine Transform) and then suitably quantized according to the human visual characteristics in each frequency band, and the other method in which a picture is divided into subbands by the Wavelet base (the Wavelet transform) and each subband is weighted and coded have been used. According to these methods, the visual distortion is not conspicuous and high compression rate can be obtained.

However, in these coding methods, as the compression rate is increased, the block starts distorting and visually undesirable effects become obvious. Thus, a structure extraction coding system which extracts feature points of the picture structure (for example, points constructing edges (pixels)) and efficiently encodes the picture data at the feature points by picture feature point detection has been introduced as the coding system which does not produce visually undesirable distortion due to the high compression rate. The structure extraction coding system has been proposed in the specification and drawings of the U.S. patent application Ser. No. 08/457,830 filed in Jun. 1, 1995 by this applicant.

FIG. 1 shows the construction of one example of a picture encoding apparatus for compressing a picture by the structure extraction coding method. In the picture encoding apparatus 1, input video signal S1 is input to a quantizer 2 and a two-dimensional change point detection circuit 3. The quantizer 2 quantizes the input video signal S1 and forms quantized coefficient S2. The quantized coefficient S2 is supplied to a chain coding circuit 4. The two-dimensional change point detection circuit 3 detects whether or not the input video signal S1 is feature point. The two-dimensional change point detection circuit 3 outputs feature point signal S3 of which value is "1" for example to the chain coding circuit 4 if the input video signal S1 is the feature point, and outputs the feature point signal S3 of which value is "0" for example to the chain coding circuit 4 if the input video signal S1 is not the feature point.

After the quantization by the quantizer 2 and the feature point detection by the two-dimensional change point detection circuit 3 have completed on one whole screen (one frame), the chain coding circuit 4 chain codes the position information on the point at which the feature point signal S3 is "1" (pixel) (the position of the feature point (coordinates)) in accordance with the quantized coefficient S2 and the feature point signal S3. Further, after multiplexing the quantized coefficient at the position of the feature point (the quantized coefficient of picture data at the pixel detected as feature point) to the position information, the chain coding circuit 4 outputs this as chain coding signal S4.

The chain coding signal S4 is supplied to a chain threshold circuit 5. The chain threshold circuit 5 removes the chain having the chain length of a threshold value T and below, and the removed chain coding signal is supplied to a buffer memory 6 as threshold chain coding signal S5. The threshold chain coding signal S5 is supplied to the buffer memory 6 to be stored once and then recorded in a recording media (not shown) or outputted to a transmission line. Output signal S6 of the buffer memory 6 is recorded in the recording media (not shown) as output signal of the picture encoding apparatus 1, or outputted to the transmission line. In addition, the buffer memory 6 is stored once the signal, so that the data size of the output signal S6 is smoothed. Therefore, the output signal of the picture encoding apparatus 1 is outputted to the recording media or the transmission line with the approximately constant data rate.

Here, the chain coding circuit 4 is constructed as shown in FIG. 2. The chain coding circuit 4 stores the quantized coefficient S2 in a coefficient frame buffer 10, and the feature point signal S3 in a mask frame buffer 11 respectively.

At this point, a X-coordinate register 12, a Y-coordinate register 13 and a status register 14 are initialized to "0" at the head of each frame. Moreover, a direction search device 15 holds the 0th to 2nd status referring to the content of the status register 14 until the X-coordinate register 12 and Y-coordinate register 13 point out the final coordinates of the frame, and repeats the following functions depending on the aforementioned 0th to 2nd status.

More specifically, at the 0th status, the direction search device 15 stores the coordinates of the point next to the coordinates presently stored in the X-coordinate register 12 and Y-coordinate register 13 observing in the order of line scanning, and makes this as the point coordinates to be processed. The direction search device 15 inputs the mask value of this point coordinates from the mask frame buffer 11, however, in the case where the mask signal is "0", it performs nothing.

On the other hand, if the mask signal S10 is "1", the direction search device 15 stores this point coordinates in a search X-coordinate register 16 and a search Y-coordinate register 17, and simultaneously initializes a counter 18 to "0" and then as well as outputting X, Y-coordinates of this point to a selector 19 as start point coordinates output S11, outputs "1" to a multiplexer 20 and a latch circuit 21 as effective data selection signal S12, and then inputs "1" to the status register 14.

After the above processing is complete, the direction search device 15 sets the mask value of the coordinates of this point in the mask frame buffer 11 to "0".

In this connection, the counter 18 is formed by three bit counter and adapted to output "0" to "7" as the count values.

When the direction search device 15 confirms that "1" is inputted in the status register 14, it becomes the first status. Under this first status if the mask value S10 of the coordinates specified by address signal S13 in the mask frame buffer 11 is "0", the direction search device 15 inputs "0" to the status register 14 when count value of the counter 18 is "7", and increments the count value of the counter 18 when the count value is less than "7".

On the other hand, in the case where the mask signal S10 is "1", the direction search device 15, as well as outputting "1" as effective data selection signal S12, sets the mask value of the point to which the mask frame buffer 11 corresponds to "0" and then inputs "2" to the status register 14.

The direction search device 15, upon confirming that "2" is inputted in the status register 14, becomes the second status. Under this second status if mask signal S10 of the coordinates specified by the address signal S13 in the mask frame buffer 11 is "0", the direction search device 15 inputs "0" to the status register 14 when the count value of the counter 18 is "7", and increments the count value of the counter 18 when the count value is less than "7".

On the other hand, in the case where the mask signal S10 is "1", it outputs "1" as effective data selection signal S12, and makes the mask value of the point to which the mask frame buffer 11 corresponds to "0".

A search X-coordinate ROM 23 and a search Y-coordinate ROM 24, making counter output S14 as address signal input, output X differential signal S15 and Y differential signal S16 to adders 25 and 26 respectively. Also, a direction ROM 27 outputs direction signal S17 to a latch circuit 21, a direction change signal generator 28, and a selector 19 making the counter output S14 as the address signal input.

An example of contents of the search X-coordinate ROM 23, search Y-coordinate ROM 24, and direction ROM 27 is shown in FIG. 3. Here, direction codes C0 to C7 used in the direction ROM 27 show each direction divided into eight, centering around A as shown in FIG. 4.

The address generator 22 receives search X-coordinate signal S18 which is the sum of the contents of search X-coordinate register 16 and X differential signal S15, and search Y-coordinate signal S19 which is the sum of the content of search Y-coordinate register 17 and Y differential signal S16, and the address generator 22 outputs address signal S13 to specify the readout address of (X, Y) coordinates in the coefficient frame buffer 10 and the mask frame buffer 11.

The latch circuit 21 holds the direction signal S17 when the effective data selection signal S12 is "1", and keeps holding it until the effective data selection signal S12 becomes "1" at the next time, and then obtains previous direction signal S20 by delaying for one sample and outputs this to the direction change signal generator 28.

The timing relation of effective data selection signal S12, direction signal S17, and the previous direction signal S20 is shown in FIG. 5. For explanation, direction codes of the direction signal S17 are lined up in numerical order of C0 to C38 in FIG. 5. However, in practice, direction codes are arranged according to the detected result of feature points.

The direction change signal generator 28 is inputted direction signal S17 and previous direction signal S20, and then outputs direction change signal S21 according to tables shown in FIG. 6 and FIG. 7. More specifically, the direction change signal generator 28 outputs direction change codes D0 to D5 or D6 corresponding to the direction change, such that if the present direction has not changed with respect to the previous direction, D0 is outputted as the direction change code, and if the present direction has changed by 45°, D1 is outputted, and if it has changed by 90°, D2 is outputted, and so on. In practice, as shown in FIG. 8, the code words having a small number of bits are allocated to the direction change codes having high occurrence probability, such as D0 and D1, and the code words having a large number of bits are allocated to the direction change codes having small occurrence probability, such as D3 and D6, i.e., the entropy coding is conducted in order to reduce the volume of information.

At the time when the effective data selection signal S12 is "1", the selector 19 refers the value of status register 14. In the case where the value of said status register 14 is "0", the selector 19 outputs the starting point coordinates output S11 to the multiplexer 20 as the position signal 22, in the case where the value of said status register 14 is "1", it outputs the direction signal S17, and when the value is "2", it outputs direction change signal S21.

At the time when the effective data selection signal S12 is "1", the multiplexer 20 multiplexes coefficient output S23 from the coefficient frame buffer 10, and position signal S22, and outputs these to the following chain threshold circuit 5 (FIG. 1) as the chain code signal S4.

With this arrangement, after the chain coding circuit 4 detects the feature point of the head of chain under the 0th status, it detects pixels around the feature point at the head of chain under the first status, and in the case where the feature point exists in the surrounding area, connects this feature point to the feature point at the head of chain by showing this feature point with direction signal S17, and then proceeds to the second status and searches pixel around the feature point detected at the first status. And in the case where the feature point exists in the surrounding area, connects this feature point to the feature point detected under the first status by showing this with direction change signal S21. Under the second status, if feature points are detected again around the feature points previously detected, the chain coding circuit 4 connects these feature points sequentially by showing these feature points with direction change signal S21.

Furthermore, under the first or the second status, in the case where no feature point exists around the feature point detected previously, this chain will be cut off and it returns to the 0th status and searches for the feature point to become the head of next chain in order of line scanning.

In the conventional chain coding system, edge chains having less than the fixed length T have been removed as noise by the chain threshold circuit 5 (FIG. 1) of the later stage, assuming that the contour of an object would be coded by one edge chain.

However, in the case where noise exists in the vicinity of contour of the object, there have been a problem that the contour of one object would be coded as multiple chain edges and coding efficiency became worse.

In the picture encoding apparatus using the structure extraction coding system described above, on status that the edge of one object is coded with one edge chain, the chain having the length of the predetermined length T and below is removed as noise by the chain threshold circuit 5 (FIG. 1) at the latter stage of the chain coding circuit 4.

However, there has been a problem that, by using such method, the edge of one object is encoded as plural edge chains if noise exists in vicinity of the object, so that the coding efficiency became worse.

Furthermore, if the thresholding are conducted by the length T on the chain coded edge, the edge chain of the object contour would be cut off as shown in FIG. 9.

Moreover, in the case where the object contours were branched, independent multiple chains would be formed, and as a result, coding efficiency has decreased.

SUMMARY OF THE INVENTION

In view of the foregoing, an object of this invention is to provide a picture encoding method and a picture decoding method capable of coding the branched object contour with a small number of codes and capable of chain coding the object contours precisely even in the case where noise exists in the neighborhood of the object contour.

The foregoing object and other objects of the invention have been achieved by the provision of the video signal coding method for coding input video signal, comprising: step for detecting the feature points of input video signal; step for chain coding the feature amount S23 and coordinates S22 of the feature points to generate chain codes; step for multiplexing the branch code D1 representing the branch part at which the part to be branched occurs on the chain to chain codes S23, S22 so as to chain code the feature point as one chain.

Furthermore, according to the present invention, the process to multiplex the branch code D1 to chain codes S23, S22 is performed recursively including the branched feature point chains.

Moreover, according to the present invention, feature points in a frame are detected in order of line scanning, and the branch code multiplexing step is performed assuming that the feature point having only one neighboring feature point in the detected feature points as the starting point of chain. Then, uncoded feature points are detected in order of line scanning and the branch code multiplexing step is performed on the uncoded feature points, making the uncoded feature points detected at first as the starting point.

Further, the foregoing object and other objects of the invention have been achieved by the provision of the video signal encoding method, comprising: step for detecting the feature points of input video signal; step for chain coding the feature amount S23 and coordinates S22 of the feature point to generate chain codes; step for multiplexing the branch code D1 representing the branch part at which the part to be branched occurs on the chain to chain codes S23, S22 so as to chain code the feature point as one chain; step for obtaining the predetermined index value (the length of chain and/or the edge intensity chain) for each chain with respect to the feature point chains which do not have the branch point in chain among the multiplexed feature point chains generated by the multiplexing step; step for comparing the index value and the predetermined threshold value T or S; and step for eliminating the branch code D1 of which the index value is the threshold value T or S and below and the chain codes S23, S22 following the branch code D1.

Furthermore, according to the present invention, at the chain eliminating step, threshold value T or S is set based on the feedback parameter C1 calculated from the capacity of the buffer 6 which temporarily stores the remaining chain code C2 uneliminated.

Furthermore, according to the present invention, at the chain eliminating step, the threshold value T or S is set depending on the feedforward parameter E1 calculated from the input feature points.

Moreover, according to the present invention, at the chain eliminating step, in the case where multiple number of feature point chains having no branch point in chain are branched from one branch point, the priority order of each chain after branched is determined depending on the amplitude of the chain before being branched and the amplitude of each chain after branched, and chain eliminating step is conducted from the chain having the lower priority order.

Furthermore, the foregoing object and other objects of the invention have been achieved by the provision of the video signal decoding method for decoding the chain coding signal D2, which comprises means for detecting the feature point of input video signal S1, means for chain coding the feature amount S23 and coordinates S22 of the feature points to generate chain code, and means for multiplexing the branch code D1 representing the part that chain is branched to chain code S23, S22, the video signal decoding method comprising: step for shunting branch code L3, coordinates code L1, L4, and feature amount code L2 from the chain coding signal D2 which consists of branch code L3, coordinates code L1, L4, and feature amount code L2; and step for decoding the coordinates L6 and the feature amount L5 of the feature point from each shunted code.

Further, the foregoing object and other objects of the invention have been achieved by the provision of a video signal encoding apparatus for coding input video signal, comprising: means for detecting the feature points of input video signal; means for chain coding the feature amount S23 and the coordinates. S22 of the feature point to generate the chain code; and means for multiplexing the branch code D1 representing the branch part where the part to be branched occurs on the chain to the chain code S23, S22 in order to chain code the feature points as one chain.

Further, the foregoing object and other objects of the invention have been achieved by the provision of the video signal encoding apparatus for encoding input video signal, comprising: means for detecting the feature points of input video signal S1; means for chain coding the feature amount S23 and coordinates S22 of the feature point to generate chain codes; means for multiplexing the branch code D1 representing the branch part where the part to be branched occurs on the chain to chain codes S23, S22 so as to chain code the feature point as one chain; means for obtaining the predetermined index value (the length of chain and/or the edge intensity of chain) for each chain with respect to the feature point chains which do not have the branch point in chain among the multiplexed feature point chains generated by the multiplexing step; means for comparing the index value and the predetermined threshold value T or S; and means for eliminating the branch code D1 of chain of which the index value is the threshold value T or S and below and the chain codes S23, S22 following the branch code D1.

Furthermore, the foregoing object and other objects of the invention have been achieved by the provision of the video signal decoding apparatus for decoding the chain coding signal D2, which comprises means for detecting the feature point of input video signal S1, means for chain coding the feature amount S23 and coordinates S22 of the feature point to generate chain code, and means for multiplexing the branch code D1 representing the part that chain is branched to chain code S23, S22, the video signal decoding apparatus comprising: means for shunting branch code L3, coordinates codes L1, L4, and feature amount code L2 from the chain coding signal D2 which consists of branch code L3, coordinates codes L1, L4, and feature amount code L2; and means for decoding the coordinates L6 and the feature amount L5 of the feature point from each shunted code.

In the case where the part to be branched occurs in the chain, since the branch code D1 to show the part to be branched is multiplexed to chain codes S23, S22, the object contour to be branched can be represented by a tree structured chain including its branches. As a result, an increase in the number of chains can be controlled and efficient chain coding can be realized. Also, since the process of multiplexing the branch code D1 to chain codes S23, S22 is recursively conducted including the feature point chains branched, a tree structured chain can be easily formed.

Furthermore, since the branch code multiplexing step is conducted making the feature point having only one neighboring feature point as the starting point of chain, and then uncoded feature points are detected in order of line scanning, and the branch code multiplexing step is conducted on uncoded feature points making the uncoded feature point detected first as a starting point, chains can be formed making the terminal point of the object contour as the chain starting point. As a result, lengthy chains can be formed and coding efficiency is improved.

Moreover, since the fixed index value (the length of chain and/or the edge intensity of chain) is obtained and the index value is compared with the fixed threshold value T or S in regard to the feature point chain having no branch point in chains, i.e., the terminal branch chains expressed by the tree structure, and in regard to the chains having the index values less than the threshold value T or S, the branch code D1 and the following chain codes S23, S22 of the chain are eliminated, the branch chains formed by noises can be effectively removed without cutting off the important chains showing the object contours.

Furthermore, since the threshold value T or S is set depending on the feedback parameter C1 calculated from the capacity of the buffer 6 which temporarily stores the remaining chain codes C2 uneliminated, unnecessary branch chains can be effectively eliminated considering the quantity of codes to be generated. Similarly, since the threshold value T or S is set depending on the feedforward parameter E1 calculated from the input feature point, unnecessary branch chains can be effectively eliminated considering the quantity of codes to be generated.

Furthermore, in the case where multiple number of feature point chains having no branch point in the chains branch off at one branch point, the priority order of each chain after branched is determined depending on the amplitude of chain before being branched and the amplitude of each chain after branched, the chain eliminating step is conducted on the chains sequentially from the chain having the lower priority order, the chains having larger difference in amplitude before and after being branched such as the chain by noise can be sequentially eliminated, and as a result, the chain eliminating process can be conducted more precisely according to the importance of chains.

Moreover, since coordinate L6 and feature vector L5 of the feature point are decoded upon shunting branch code L3, coordinate codes L1, L4 and feature vector code L2 from the chain coding signal D2, the object contours can be easily decoded from the chain coding signal D2 shown by the tree structure multiplexed the branch code L3.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a table showing the contents of search X-coordinate ROM, search Y-coordinate ROM and direction ROM;

FIG. 4 is a table showing the allocation of direction codes;

FIGS. 6 and 7 are tables illustrating direction change signal;

FIG. 8 is a table illustrating an example of code words application to the direction change signal;

FIG. 12 is a schematic diagram showing an example of code words allocation to direction change signal, branch signal, and end of chain signal;

FIGS. 16A to 16E are schematic diagrams explaining the function of the threshold circuit;

FIGS. 20A and 20B are schematic diagrams showing the filter coefficient in the case of conducting the digital filter processing by the chain thresholder;

DETAILED DESCRIPTION OF THE EMBODIMENT

Preferred embodiment of this invention will be described with reference to the accompanying drawings:

First, a chain coding circuit 4 according to this invention will be explained.

Figure 2:
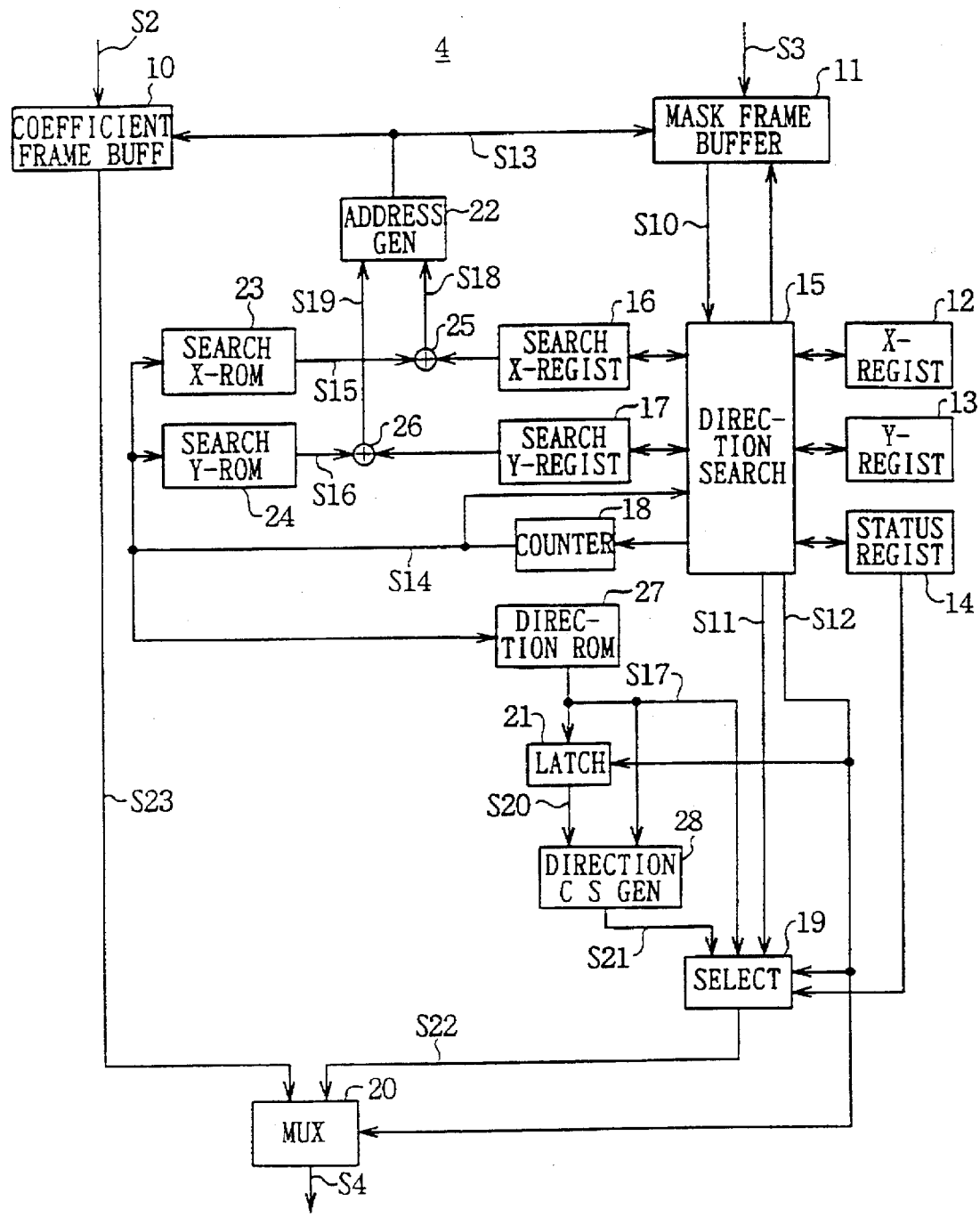
FIG. 2 is a block diagram showing the construction of the conventional chain coding circuit.

FIG. 2 shows the construction of chain coding circuit 4 according to this invention.

The chain coding circuit 4 stores the quantized coefficient S2 once in a frame buffer 10 and stored the feature point signal S3 once in a mask frame buffer 11 respectively. Then, in a direction search device 15, the processing described below is executed.

Then, a X-coordinate register 12, a Y-coordinate register 13, and a status register 14 are initialized to "0" at the head of each frame. Here, the value showing the 0th to 2nd status are stored in the status register 14. The direction search device 15 repeats the operation described below in accordance with the 0th to 2nd status until the X-coordinate register 12 and Y-coordinate register 13 designate the final coordinates of frame, while referring to the content of the status register 14.

More specifically, in the 0th status, the direction search device 15 stores the coordinates of next point, which is searched in order of line scanning, of the coordinates being stored currently in the X-coordinate register 12 and the Y-coordinate register 13. The direction search device 15 inputs the mask value of the point coordinates from the mask frame buffer 11. If the mask signal S10 is "0", the direction search device 15 performs nothing. On contrary, if the mask signal S10 is "1", the direction search device 15 stores the coordinate of this point in a search X-coordinate register 16 and a search Y-coordinate register 17, and simultaneously initializes a counter 18 to "0". Thereafter, the direction search device 15 outputs the X- and Y-coordinates of this point to a selector 19 as the starting point coordinate output S11, and outputs "1" to the selector 19, a multiplexer 20, and a latch circuit 21 as the effective data selection signal S12. Next, the direction search device 15 writes "1" in the status register 14. After terminating the above processing, the direction search device 15 makes the mask value of the coordinates of this point in the mask frame buffer 11 to "0".

The counter 18 is composed of three bit counter, and outputs "0" to "7" as count value.

The direction search device 15 detects "1" in the status register 14 and becomes to be a first status. In the first status, the direction search device 15 writes "0" in the status register 14, when the mask value S10 in the mask frame buffer 11 of the coordinates specified by address signal S13 is "0" and when the count value of the counter 18 is "7". The direction search device 15 increases the count value of the counter 18 when the count value is less than "7".

On contrary, the direction search device 15 outputs "1" as the effective data selection signal S12 if the mask signal S10 is "1", and makes the mask value of the point corresponding to the mask frame buffer 11 to "0". Next, the direction search device 15 writes "2" in the status register 14.

The direction search device 15 detects "2" in the status register 14 and becomes to be a second status. In the second status, the direction search device 15 writes "0" in the status register 14 when the mask value S10 in the mask frame buffer 11 of the coordinates specified by address signal S13 is "0" and when the count value of the counter 18 is "7". The direction search device 15 increases the count value of the counter 18 when the count value is less than "7".

On contrary, the direction search device 15 outputs "1" as the effective data selection signal S12 if the mask signal S10 is "1", and makes the mask value of the point corresponding to the mask frame buffer 11 to "0".

The search X-coordinate ROM 23 and search Y-coordinate ROM 24 receive the counter output S14 as address signal, and output the X differential signal S15 and Y differential signal S16 to adders 25 and 26 respectively. The direction ROM 27 receives the counter output S14 as address signal, and outputs the direction signal S17 to the latch circuit 21, the direction change signal generator 28, and the selector 19.

FIG. 3 shows the content example of the search X-coordinate ROM 23, the search Y-coordinate ROM 24, and the direction ROM 27. Here, the direction codes C0 to C7 which are used in the direction ROM 27 are codes for showing each direction divided into eight with "A" being centered as shown in FIG. 4.

The address generator 22 receives the search X-coordinate signal S18 which is the sum of the content of the search X-coordinate register 16 and X differential signal S15, and the search Y-coordinate signal S19 which is the sum of the content of the search Y-coordinate register 17 and the search Y differential signal S16 as an input, and outputs the address signal S13 specifying the readout address of the (X, Y) coordinates in the coefficient frame buffer 10 and the mask frame buffer 11.

The latch circuit 21 holds the direction signal S17 when the effective selection signal S12 is "1" and keeps holding it until the next effective data selection signal S12 becomes "1" next, thereafter, obtains the previous direction signal S20 by delaying for one sample. Then, the latch circuit 21 outputs the previous direction signal S20 to the direction change signal generator 28.

Figure 5:
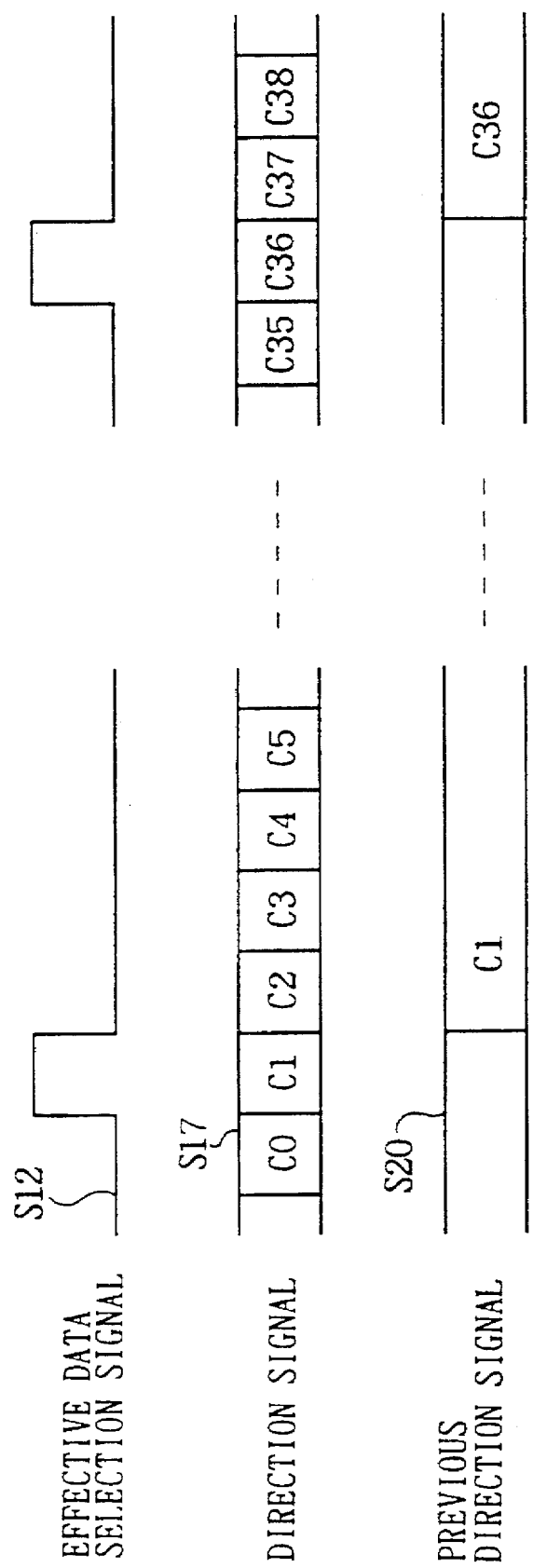
FIG. 5 is a timing chart showing the timing of effective data selection signal, direction signal, and previous direction signal.
Figure 9:
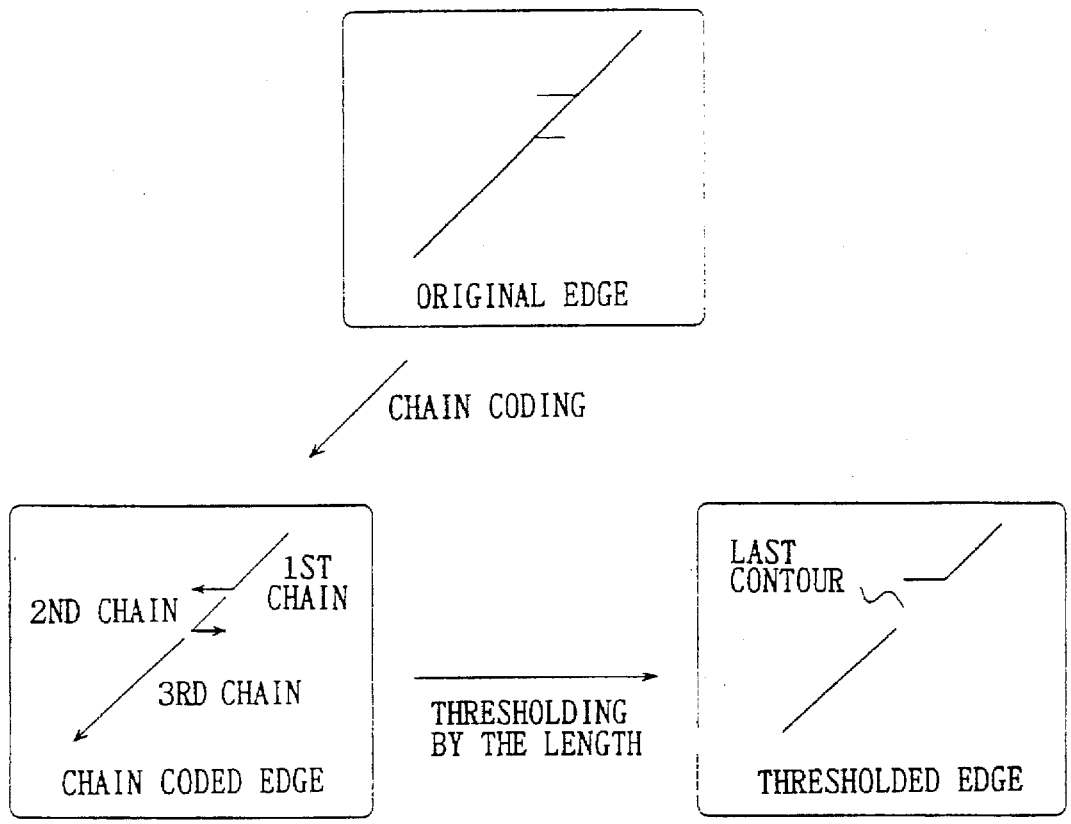
FIG. 9 is a schematic diagram illustrating the chain cutting which occurs by the conventional chain coding.

FIG. 5 shows the timing relation of the effective data selection signal S12, direction signal S17, and the previous direction signal S20 at this time. In addition, in FIG. 5, the direction codes of the direction signal S17 is represented by arranging in order of the number of C0 to C38 for explanation, but in practice, the direction codes C0 to C7 are arranged in accordance with the detected result of feature points.

The direction change signal generator 28 receives the direction signal S17 and the previous direction signal S20, and outputs the direction change signal S21 in accordance with tables shown in FIGS. 6 and 7. More specifically, the direction change signal generator 28 outputs the direction change codes D0 to D5 or D6 corresponding to the direction change, in such a manner that D0 is outputted if the current direction has not changed with respect to the previous direction, D1 is output if the current direction is changed by 45°, D2 is output if the current direction is changed by 90°, . . . . Practically, the entropy coding is performed on these direction change codes D0 to D6, as shown in FIG. 8, so that the data size can be reduced, the entropy coding being a coding such that the code words having a small number of bits are assigned to the direction change codes having large generation rate such as D0 and D1, and the code words having a large number of bits are assigned to the direction change codes having small generation rate such as D3 and D6, for example.

The selector 19 refers the value of the status register 14 when the effective data selection signal S12 is "1". Then, the selector 19 outputs the starting point coordinates output S11 to the multiplexer 20 as the position signal S22 if the value of the status register 14 is "0". Also, the selector 19 outputs the direction signal S17 to the multiplexer 20 as the position signal S22 when the value is "1", and outputs the direction change signal S21 to the multiplexer 20 as the position signal S22 when the value is "2".

Figure 1:
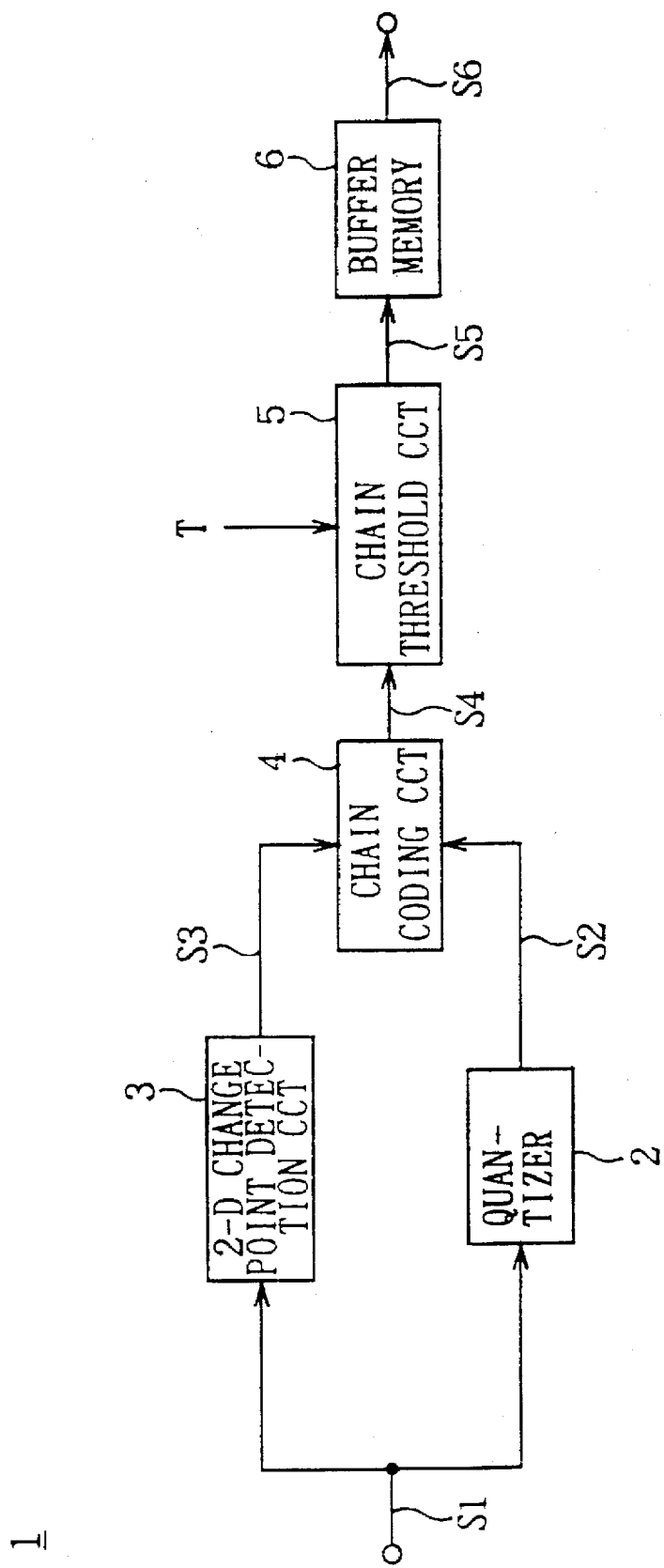
FIG. 1 is a block diagram showing the construction of the conventional structure extraction coding device.

The multiplexer 20 multiplexes the coefficient output S23 from the coefficient frame buffer 10 and the position signal S22 when the effective data selection signal S12 is "1", and outputs this to the following chain threshold circuit 5 (FIG. 1) as the chain coding signal S4.

In this way, when the chain coding circuit 4 detects the feature point of the chain head under the 0th status, it searches the pixel around the feature point of the chain head under the following first status. Then, if the chain coding circuit 4 detects the feature point around the feature point of chain head, it connects the feature point to the feature point of the chain head by representing with the direction signal S17. Next, the chain coding circuit 4 proceeds to the second status, and searches the pixel around the feature point detected in the first status. Then, if the chain coding circuit 4 detects the feature point, it connects the feature point to the feature point detected in the first status by representing with the direction change signal S21. In the second status, when the chain coding circuit 4 detects again the feature point around the feature point detected previously, it connects these feature points succeedingly by representing with the direction change signal S21.

Further, in the first and second status, if the next feature point does not exist around the feature point detected previously, the chain coding circuit 4 cuts off this chain, returns to the 0th status again, and searches the feature point being the head of next chain in order of line scanning.

Next, the construction of a chain coding circuit 30 according to this invention will be described.

Figure 10:
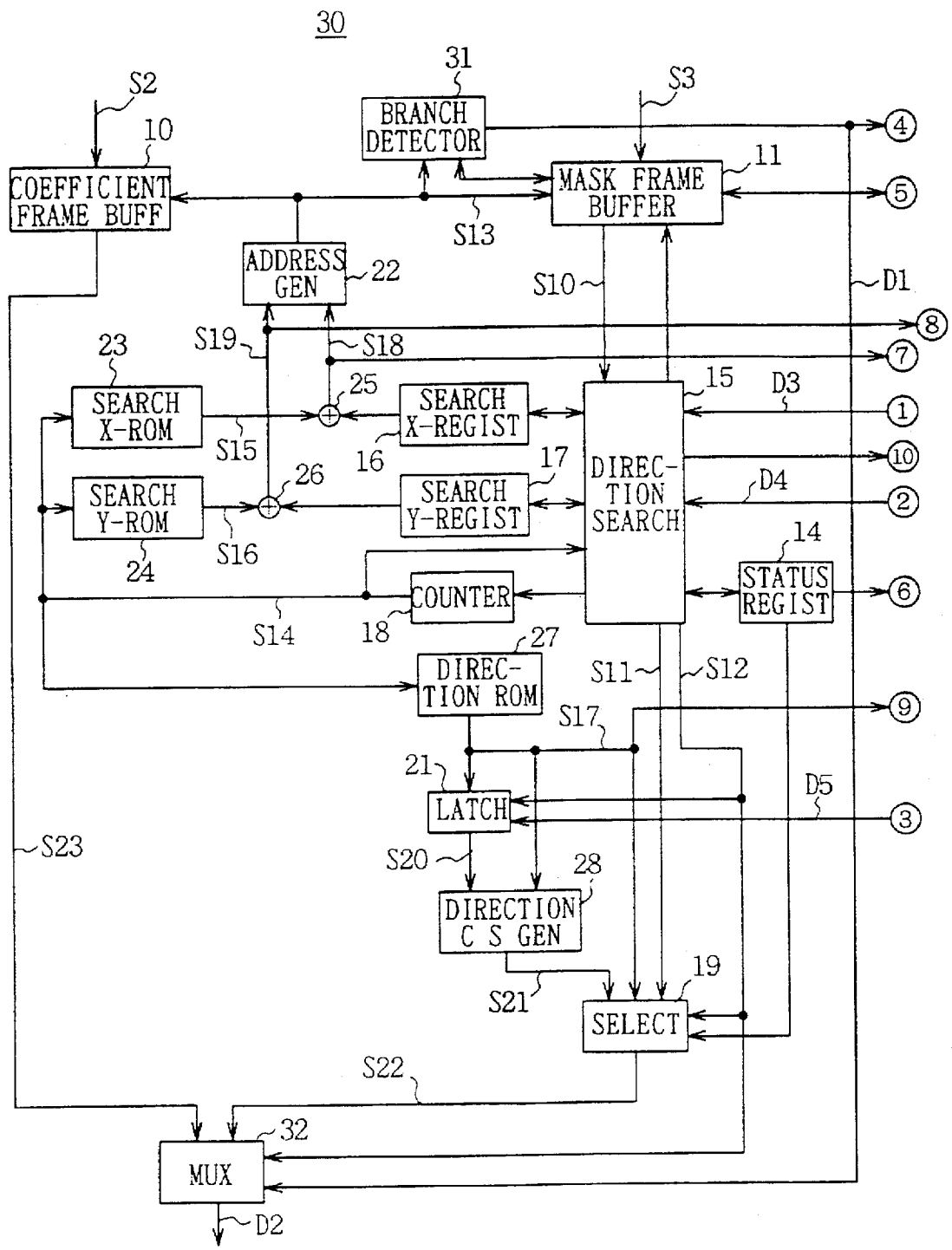
FIGS. 10 and 11 are block diagrams showing the construction of a chain coding circuit according to the present invention.
Figure 11:
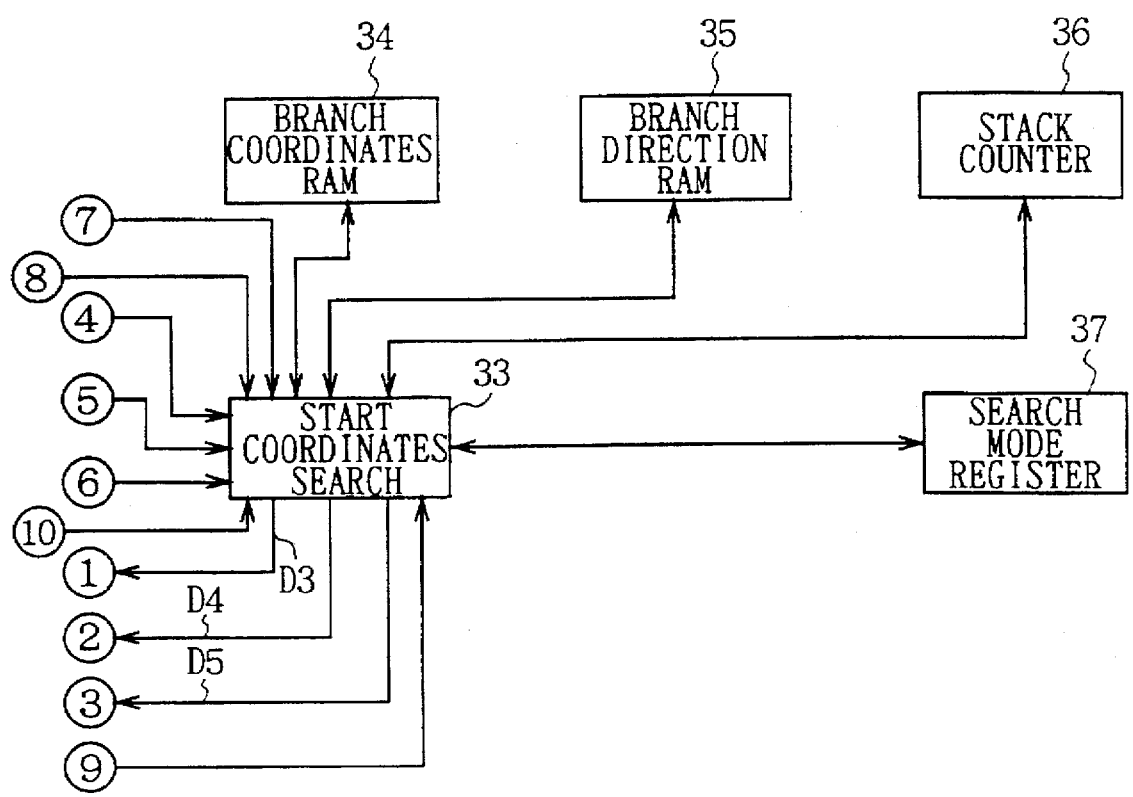

FIGS. 10 and 11 are block diagrams showing the construction of the chain coding circuit 30 in this invention. In each part of the chain coding circuit 30 of this invention, corresponding parts of FIG. 2 are given the same reference numerals, and the description is omitted. The chain coding circuit 30 has a branch detector 31, and branch signal D1 detected at the branch detector 31 is outputted to a multiplexer 32.

At the time when the effective data selection signal S12 is "1", the multiplexer 32 multiplexes quantized coefficient S23 and position signal S22 and outputs this as chain code signal D2. Furthermore, when the branch signal D1 is "1", the multiplexer 32 multiplexes the branch signal D1 and outputs this as the chain code signal D2.

Accordingly, the chain coding circuit 30 of this invention multiplexes the branch signal D1 to the part where the chain is branched as the branch flag, when the chain is branched. Therefore, according to this invention, the object contour part can be shown by the tree structure and can be coded as a chain even if the object contour part is branched off. As a result, the quantity of codes on the coordinates of the starting point can be decreased and thereby coding efficiency can be improved.

In practice, by adding the branch detector 31, a start coordinates search device 33, a branch coordinates RAM 34, a branch direction RAM 35, a stack counter 36 and a search mode register 37 to the chain coding circuit 4 (FIG. 2), the chain coding circuit 30 forms the tree structured chain in utilizing these.

The branch coordinates RAM 34 stores the X-, Y-coordinates when the branch signal D1 from the branch detector 31 is "1". Also, the branch direction RAM 35 stores the direction signal when the branch signal D1 from the branch detector 31 is "1".

Further, the stack counter 36 counts the count value when the branch signal D1 from the branch detector 31 is "1".

Next, the operation of the chain coding circuit 30 will be explained.

First, similar to the chain coding circuit 4, the chain coding circuit 30 temporarily stores the quantized coefficient S2 in a frame buffer 10 and the feature point signal S3 in a mask frame buffer 11 respectively. Then, the start coordinates search device 33 and the status register 14 are initialized to "0" at the head of each frame. Here, the status register 14 stores the value showing the 0th to second status. The start coordinates search device 33 repeats the operation described later in accordance with the 0th to second status, referring to the content of the status register 14, until the value read out from the mask frame buffer 11 indicates the final coordinates of frame. Also, the direction search device 15 repeats the operation of direction search device 15 shown in FIG. 2 described above, in accordance with the X-, Y-coordinates from the start coordinates search device 33.

More specifically, in the 0th status, the direction search device 15 inputs the mask value corresponding to X-, Y-coordinates from the start coordinates search device 33 from the mask frame buffer, and repeats the same operation of the direction search device 15 shown in FIG. 2 described above in accordance with the 0th to second status, referring to the content of the status register 14, until X, Y-coordinates from the start coordinates search device 33 indicates the final coordinates of frame.

Then, while the direction search device 15 repeats the above operation, the branch detector 31 inputs the address specifying signal S13 and scans the mask value in vicinity of the surroundings 8 in the position of specified address. The branch detector 31 outputs "1" to branch signal D1 when sum of mask values is more than "2", and outputs "0" to branch signal D1 in other case.

Further, the direction search device 15 searches the feature point to the end of branch chain, thereafter it makes the status register "0". When the status register 14 becomes "0", the start coordinates search device 33 executes the processing described later depending on the case whether or not there is a branch point in the branch chain.

Next, the operation of the start coordinate search device 33 will be described.

At the time when the value of status register 14 is "0" and the value of stack counter 36 is more than "1", the start coordinates search device 33 outputs X, Y-coordinates of the branch point stored last in the branch coordinates RAM 34 as start X-coordinate signal D3 and start Y-coordinate signal D4, as well as outputting direction signal of the branch point stored last in the branch direction RAM 35 as branch direction signal D5. Then, the start coordinates search device 33 eliminates the value of X, Y-coordinates at the branch point read out from the branch coordinates RAM 34 and the value of direction signal at the branch point read out from the branch direction RAM 35, and decreases the value of the stack counter 36 by "1".

At this point, if the value of the status register 14 is "0", it shows the end of chain, and if the value of the stack counter 36 is more than "1", it means that branch points exist on the way.

Accordingly, the chain coding circuit 30, after searching feature points up to the end of the branch chain, returns to the branch point of that branch chain and starts again searching for feature points.

Furthermore, at the time when the value of the status register 14 is "0", when the value of the stack counter 36 is "0", and when the value of the search mode register 37 is "0", the start coordinates search device 33 scans the mask frame buffer 11 in order of line scanning, and outputs X, Y-coordinates of the point at which the mask value is "1" and having only one neighboring pixel with mask value "1" in the vicinity of circumference 8 detected first, as the start X-coordinate signal D3 and start Y-coordinate signal D4. Then, the direction search device 15 executes the operation described in FIG. 2.

With this arrangement, when the chain coding circuit 30 judges that the process of searching the branch chains is complete, it starts again searching the start point of new chain.

Moreover, at the time when the value of status register 14 is "0", when the value of stack counter 36 is "0", and when the value of search mode register 37 is "1", the start coordinates search device 33 scans the mask frame buffer 11 in order of line scanning, and outputs X, Y-coordinates of the point having the mask value "1" detected first as the start X-coordinate signal D3 and start Y-coordinate signal D4. Then, the direction search device 15 executes the operation described in FIG. 2, At this point, if the value of search mode register 37 is "1", it means that this is the second search mode on a frame of picture.

Furthermore, when the search coordinates reaches to the end of the inside of frame, the start coordinates search device 33 sets the first coordinates value in the frame to the search coordinates, and at the time when the value of search mode register 37 is "0", it sets "1" as the value of search mode register 37 and conducts again the processing on the same frame, and in the case where the value of search mode register 37 is "1", it sets "0" as the value of search mode register 37 and proceeds to the processing of the next frame.

Thus, when the chain coding circuit 30 completes the first chain coding process on one frame, it performs the second chain coding process on the uncoded feature points, and thus, all feature points will be chain coded.

Moreover, at the time when branch signal D1 is "1", the start coordinates search device 33 stores values of the search X-coordinate signal S18 and search Y-coordinate signal S19 in the branch coordinates RAM 34 and stores the direction signal S17 in the branch direction RAM 35, and increments the value of the stack counter 36.

The search mode register 37 is initialized to "0" at the head of frame.

FIG. 12 shows an example of code words allocation of direction change signal S20, branch signal D1, and end of chain signal.

According to the foregoing construction, the chain coding circuit 30 successively searches continuous feature points and performs chain coding on the object contours by connecting quantized coefficient S23 and position signal S22 of said continuous feature points. At this point, the chain coding circuit 30 multiplexes the branch signal D1 on the part where the feature point chain branches off. As a result, chain code signal D2 expressed by the tree structure is formed.

Moreover, in the case of forming branch chains, the chain coding circuit 30 conducts chain coding on the branch by searching feature points up to the end of the branch chain and then returns to the branch point of that branch and chain codes the other branch chain. In the chain coding circuit 30, object contours branched can be included in one chain by repeating recursive processing starting from the branch point and chain coding the branch chains.

Figure 13:
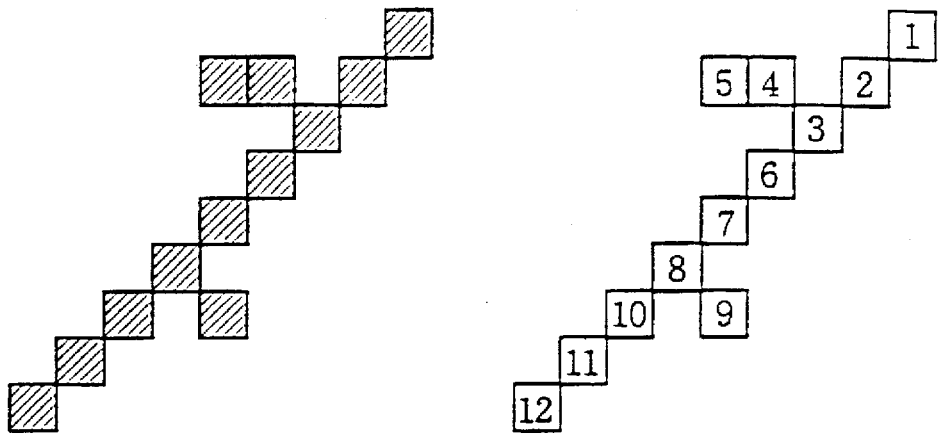
FIGS. 13A to 13C are schematic diagrams explaining the function of a chain coding circuit.
Figure 13:
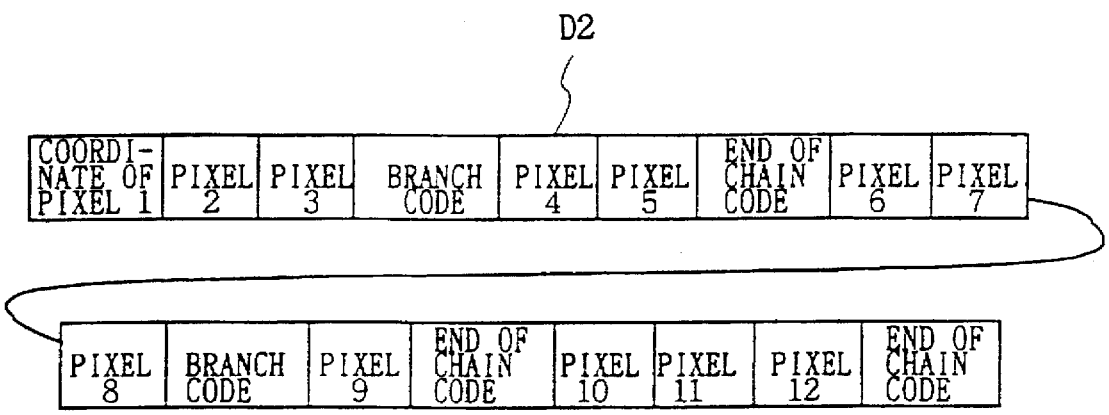

At this point, FIGS. 13A to 13C show application examples in case of chain coding the object contour branched by the chain coding circuit 30. More specifically, the chain coding circuit 30 conducts chain coding on the feature points arranged as shown in FIG. 13A in the order as shown in FIG. 13B. And then, the coding bit line of the chain code signal D2 becomes as shown in FIG. 13C.

The chain coding circuit 30, after conducting the chain coding process on the whole screen of one frame, conducts the second chain coding process on the same frame. In this second chain coding process, the chain coding circuit 30 performs the same processing as those of the first chain coding process aiming at remaining feature points uncoded at the first processing. As a result, all feature points showing object contours are coded.

According to the foregoing construction, when the part to be branched occurs in the feature point chain, the chain code signal D2 is generated by multiplexing branch signal D1 showing the branch part to the quantized coefficient S23 and the position signal S22 and thereby feature point chains can be shown by the tree structure and coding efficiency can be improved.

Next, the construction example of the chain decoding apparatus according to this invention will be described below.

Figure 14:
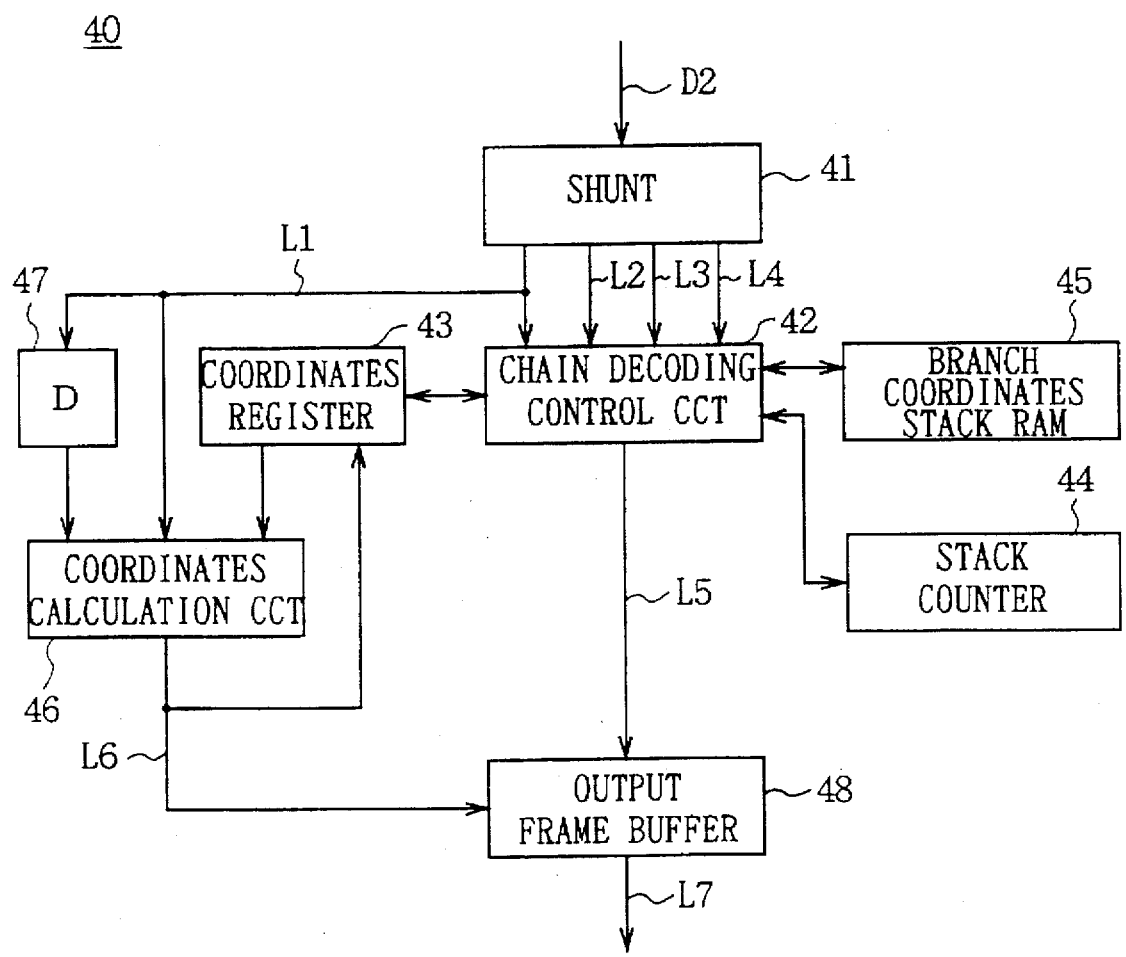
FIG. 14 is a block diagram showing the construction of a chain code decoding device according to the present invention.

FIG. 14 shows a chain decoding apparatus 40 for decoding the signal encoded by the chain coding circuit 30. The chain decoding apparatus 40 inputs the chain code signal D2 to a shunt 41. The shunt 41 shunts this chain code signal D2 to direction signal L1, feature amount coefficient signal L2, branch signal L3 and chain end signal L4, to output to each corresponding circuit at later stage.

The chain decoding control circuit 42 sets direction signal L1, which is the coordinates of chain start coordinates point, to the coordinates register 43 at the head of the chain. Also, the chain decoding control circuit 42 stores the content of the coordinates register 43 at the time of inputting the branch signal L3 in the branch coordinates stack RAM 45, and increases the value of the stack counter 44 by "1".

The chain decoding control circuit 42 is inputted the chain end signal L4, and sets the coordinates signal stored last in the branch coordinates stack RAM 45 to the coordinates register 43, if the value of stack counter 44 is more than "1". Then, the chain decoding control circuit 42 eliminates the coordinates signal read out from the branch coordinates stack RAM 45, and decreases the value of the stack counter 44 by "1".

Furthermore, if the branch signal L3 and chain end signal L4 are not given to the chain decoding control circuit 42, it outputs feature amount coefficient signal L2 as decoded feature amount signal L5.

The coordinates calculation circuit 46 is inputted direction signal L1 directly or through the delay circuit 47 for sample delay, and at the same time inputted the output of coordinates register 43. Then, the coordinates calculating circuit 46 calculates the following decoded coordinates depending on the present direction signal L1, the content of the direction signal L1 of one sample before, and the content of the coordinates register 43 showing the present coordinates. Also, the stack counter 44 is initialized to "0" at the head of each frame.

The output frame buffer 48 stores decoded feature amount signal L5 in the address which corresponds to the coordinates assigned at the decoded coordinates signal L6. Then, when the decoding process on one frame is complete, the output frame buffer 48 outputs this signal stored as decoded feature point signal L7. Accordingly, the chain code decoding apparatus 40 can easily obtain decoded feature point signal L7 which shows the coordinates and the feature amount of the feature point from the chain code signal D2.

Next, the construction of a chain threshold circuit according to this invention will be described below.

Figure 15:
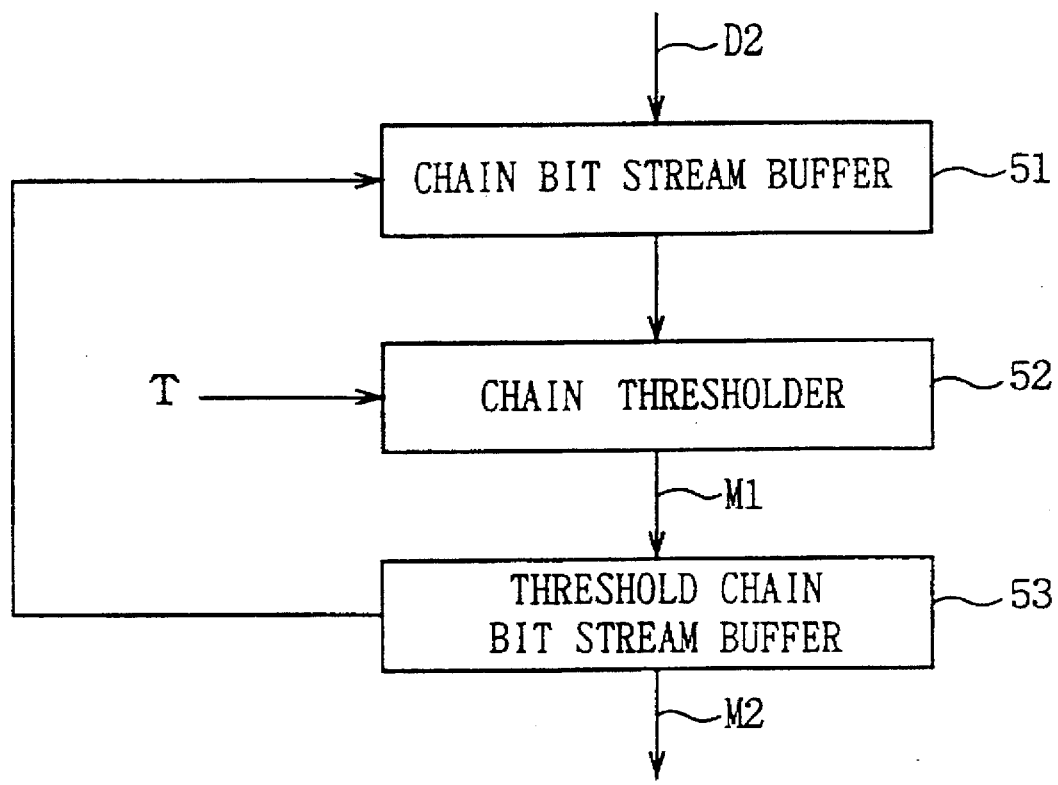
FIG. 15 is a block diagram showing the construction of a threshold circuit according to the present invention.
Figure 17:
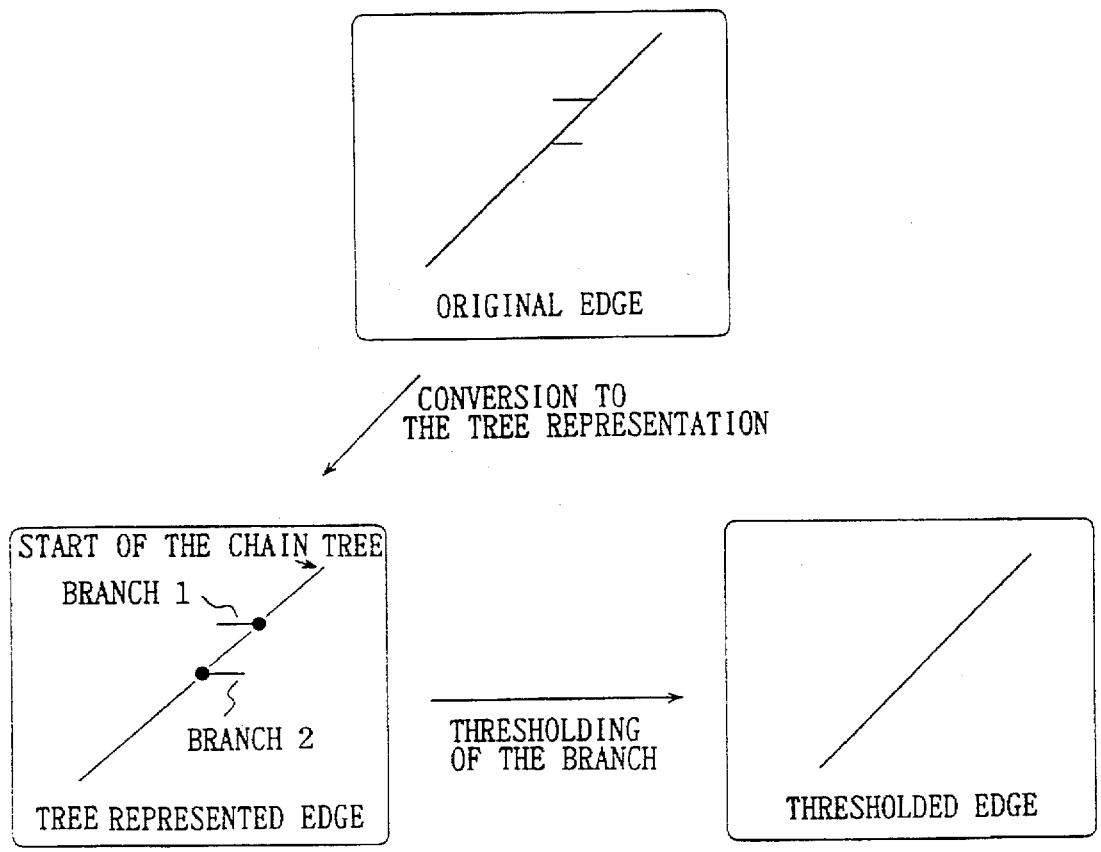
FIG. 17 is a schematic diagram explaining the function of the threshold circuit.

FIG. 15 shows a chain threshold circuit 50 according to the present invention. The chain threshold circuit 50 corresponds to the chain threshold circuit 5 described above in FIG. 1. The chain threshold circuit 50, by eliminating excess branch chains from chain code signal D2 expressed by the tree structure according to the chain coding circuit 30 (FIG. 10 and FIG. 11), keeps only object contours remaining as the feature point chains.

In practice, the chain threshold circuit 50 stores chain code signal D1 once in a chain bit stream buffer 51.

In the case where a chain thresholder 52 detects the bit stream which does not contain more than one branch code between the branch code and the end of chain code, it counts the number of direction elements (D0 to D6) existing between the branch code and the end of chain code. And in the case where the number of direction elements exceeds the fixed threshold level T, the chain thresholder 52 outputs the bit stream between the branch code and the end of chain code as threshold chain code signal M1. On the other hand, if the number of direction elements (D0 to D6) is under the threshold level T, it eliminates the bit stream between the branch code and the end of chain code.

Moreover, regarding the bit stream having more than one branch code on the way between the branch code and the end of chain code, the chain thresholder 52 outputs it as threshold chain code signal M1.

In the case where the number of thresholdings is less than the fixed number N, a threshold chain code signal buffer 53 transmits signal in the buffer to the chain bit stream buffer 51. And then, when it completes the assigned N numbers of processing, outputs the content of the buffer as threshold chain code output signal M2.

According to the foregoing construction, the chain threshold circuit 50 judges whether to keep the bit stream or not by conducting the threshold judgment process on the bit stream not containing branch code on the way from the branch code to the end of chain code. At this point, the bit stream not containing branch code on the way from the branch code to the end of chain code, it means that this bit stream is a terminal branch chain of the tree structure.

The chain threshold circuit 50 uses the number of direction signals (D0 to D6) contained in the terminal branch chain as the index value in case of threshold judgment. And if the number of direction elements (D0 to D6) contained in the terminal branch chain is small, this terminal branch chain is very short and it is most probable that this would be the chain formed by noise and then this chain is eliminated. On the other hand, if the number of direction elements (D0 to D6) contained in the terminal branch chain is large, this terminal branch chain is long and it is most probable that this chain would be the chain of object contour, this chain is not eliminated but kept as it is.

Accordingly, in the chain threshold circuit 50, as shown in FIGS. 16A to 16E and FIG. 17, threshold chain code output signal M2 (FIG. 16D) can be obtained from chain code signal D2 (FIG. 16C) expressed by the tree structure by multiplexing the branch code not cutting off the important chain but effectively eliminating only unimportant branch chains. As a result, the structure extraction coding device of this invention can improve coding efficiency.

According to the foregoing construction, by multiplexing the branch code D1 to the codes showing the position of feature point and feature amount, branch chains formed by noise can be removed effectively from the chain code signal D2 represented by the tree structure.

Next, the construction of the structure extraction coding device according to this invention will be described below.

Figure 18:
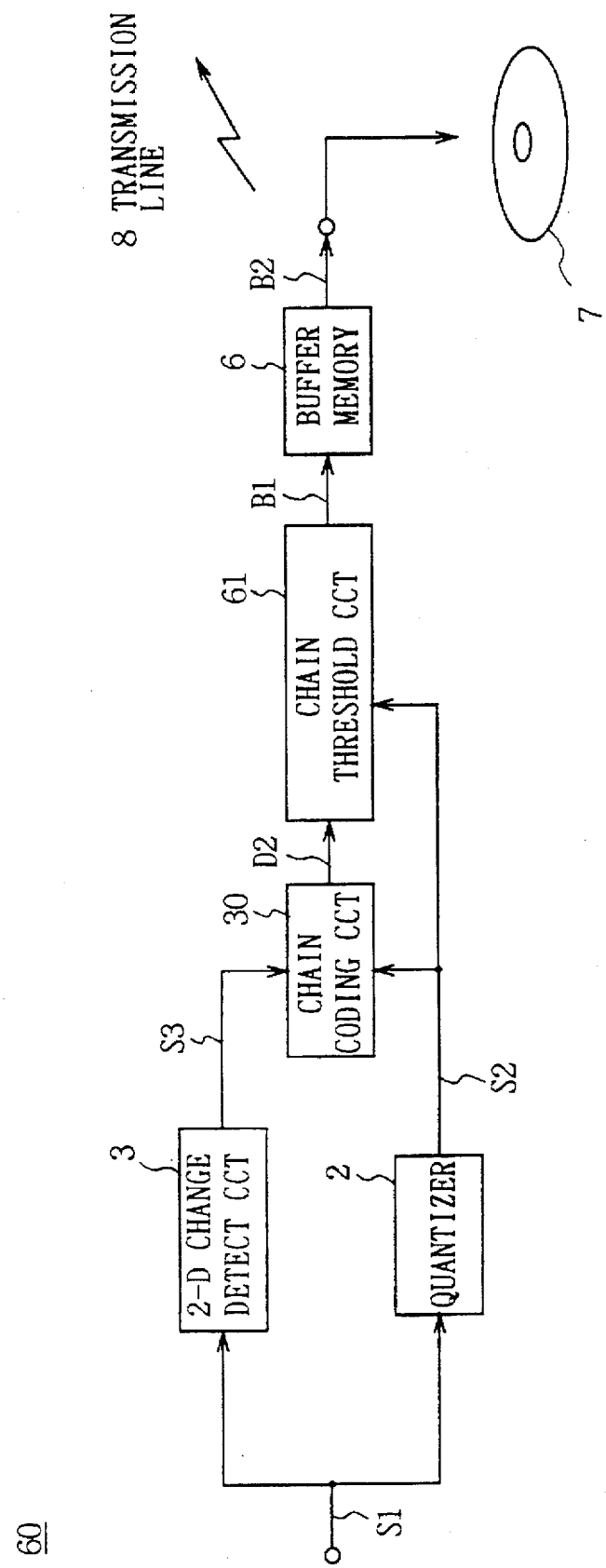
FIG. 18 is a block diagram showing the construction of a structure extraction coding device according to the present invention.

FIG. 18 is a block diagram showing the construction of a structure extraction coding device 60. The parts corresponding to FIG. 10 in each part of the structure extraction coding device 60 are given the same reference numerals, and the explanation is omitted. Further, the structure extraction coding device 60 applies the chain coding circuit 30 (FIG. 10 and FIG. 11) described above.

The structure extraction coding device 60 supplies chain code signal D2 from the chain coding circuit 30 to a chain threshold circuit 61 and simultaneously gives quantized coefficient signal S2 from the quantizer 2 to the chain threshold circuit 61.

The chain threshold circuit 61 generates threshold chain coding signal B1 by conducting the two-dimensional thresholding based on the length of chain and the average edge intensity of chain.

The volume of information of threshold chain coding signal B1 is smoothed by the following buffer memory 6 and becomes output signal B2 of the structure extraction coding device 60. The output signal B2 is recorded in an optical disc, a magneto-optical disc, or the semiconductor memory which are a recording media 7 via an error correction circuit and a modulation circuit which are not shown. Or, the output signal B2 is outputted to a transmission line via the error correction circuit and the modulation circuit which are not shown.

Figure 19:
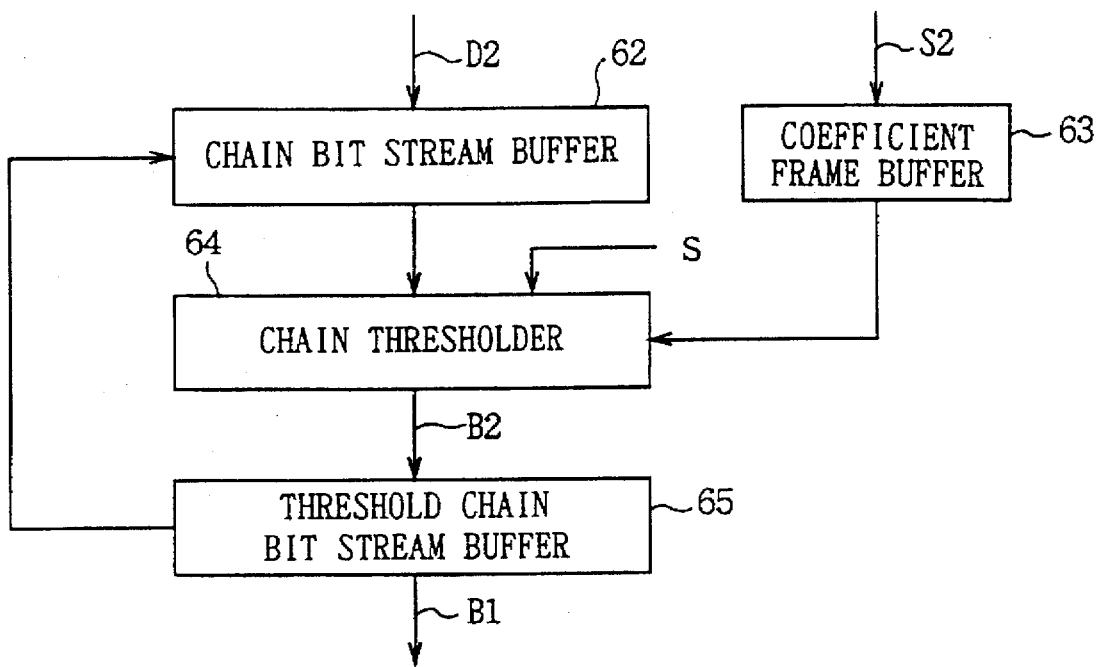
FIG. 19 is a block diagram showing the construction of the other chain threshold circuit of the structure extraction coding device according to this invention.

Here, the chain threshold circuit 61 is constructed as shown in FIG. 19. The chain threshold circuit 61 stores chain code signal D2 once in a chain bit stream buffer 62. Also, the chain threshold circuit 61 stores quantized coefficient signal S2 in a coefficient frame buffer 63.

Figures 20, 21:
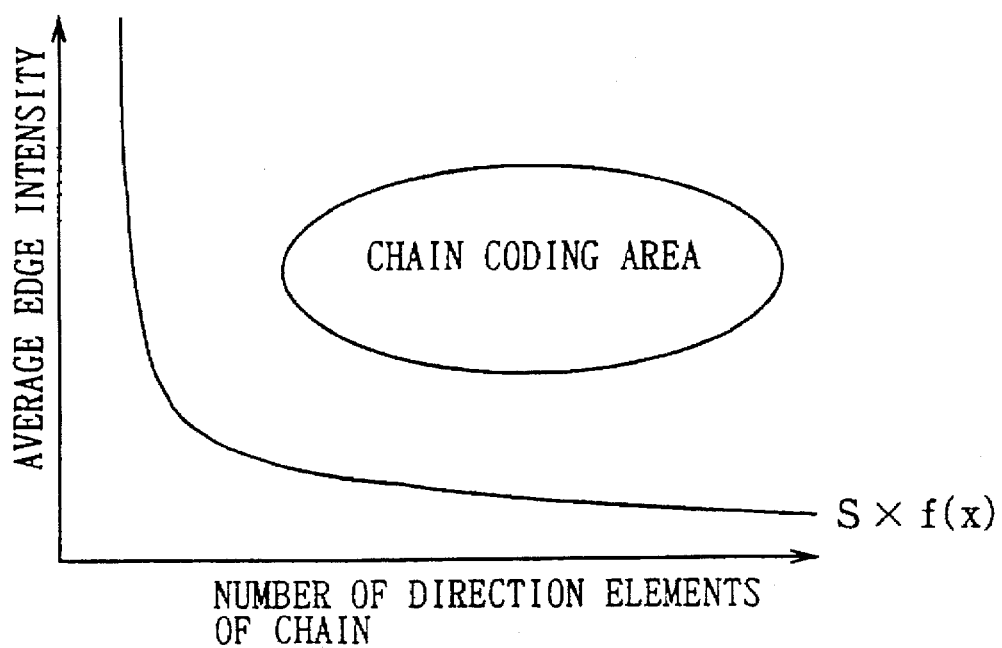
FIG. 21 is a schematic diagram explaining the two-dimensional thresholding by the chain thresholder.

In the case where a chain thresholder 64 detects the bit stream not containing more than one branch code between the branch code and end of chain code, it conducts two-dimensional thresholding as shown in FIG. 21 by using the number of direction elements in a chain between the branch code and the end of chain code and the average edge intensity of the chain (i.e., as shown in FIGS. 20A and 20B, the sum of absolute value of the values of which two kinds of filter coefficients are multiplied at each point of chain are added with respect to all points in the chain, and the added value is divided by the number of direction elements.).

More specifically, only when the number of direction elements of chain and the average edge intensity are on the higher region than the thresholding function S×f(x) of which the basic thresholding function f(x) is multiplied by the scale parameter S, the chain thresholder 64 outputs the bit stream between the branch code and the end of chain code as threshold chain code signal B2. Also, the chain thresholder 64 outputs the bit stream containing more than one branch code between the branch code and the end of chain code as threshold chain code signal B2 as it is.

In the case of this embodiment, a function of inverse proportional form to be expressed in the following equation is used for the basic thresholding function f(x).

$$f(x) = \frac{a}{x} + b \tag{1}$$

In the case where the number of threshold processing on one frame is less than some assigned number, a threshold chain bit stream buffer 65 transmits the signal in the buffer to the chain bit stream buffer 62. Moreover, when N numbers of processing are concluded, the threshold chain bit stream buffer 65 outputs contents of the buffer as threshold chain code output signal B1.

According to the foregoing construction, the chain threshold circuit 61 conducts the threshold judging process on the bit stream not containing the branch code between the branch code and the end of chain code, and judges whether to keep this bit stream or eliminate it. At this point, if branch code is not included between the branch code and the end of chain code, this means that this bit stream is the terminal branch chain of the tree structure.

In the case of judging the threshold value, the chain threshold circuit 61 uses the number of direction elements contained in the terminal branch chain and the average edge intensity as the index value. And if this index value is small, it is most probable that this branch chain is the chain by noise, and this chain is eliminated. On the other hand, if this index value is large, it is most probable that this branch chain is the chain to show the object contours and this chain is not eliminated but remains.

Accordingly, in the chain threshold circuit 61, as shown in FIGS. 16A to 16E and FIG. 17, only unnecessary branch chains are effectively eliminated without cutting off the important chains from the chain code signal D1 (FIG. 16C) expressed by the tree structure by multiplexing the branch code and threshold chain code output signal B1 (FIG. 16D) can be obtained. As a result, the structure extraction coding device of this invention can improve.

According to the foregoing construction, by multiplexing the branch code D1 to codes representing the position and feature amount of the feature point, the branch chain formed by noise can be effectively eliminated from the chain code signal D2 expressed by the tree structure.

Further, the construction of the structure extraction coding device according to this invention will be described below.

Figure 22:
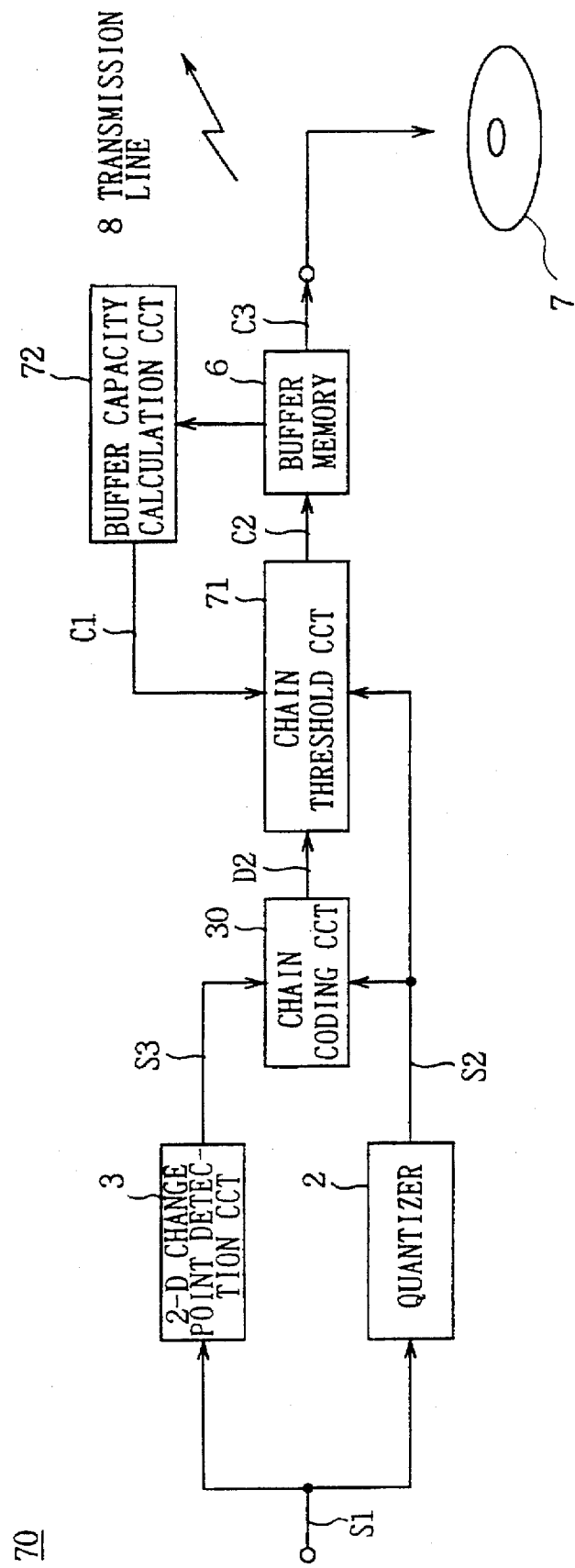
FIGS. 22 and 23 are block diagram showing the construction of the other structure extraction coding device according to the present invention.

FIG. 22 shows a block diagram showing the construction of other structure extraction coding device 70 according to this invention. The parts corresponding to FIG. 10 in each part of the structure extraction coding device 70 are given the same reference numerals, and the explanation is omitted. The structure extraction coding device 70 applies the chain coding circuit 30 (FIG. 10 and FIG. 11) described above.

The structure extraction coding device 70, as well as supplying the chain code signal D2 from the chain coding circuit 30 to a chain threshold circuit 71, supplies the quantized coefficient signal S2 from the quantizer 2.

In addition to this, the structure extraction coding device 70 gives threshold parameter signal C1 calculated by a buffer capacity calculation circuit 72 to the chain threshold circuit 71.

The threshold circuit 71 generates threshold chain code signal C2 by conducting the thresholding only for the length of chain, or the length of chain and the average edge intensity of chain of the chain code signal D2 using the threshold parameter signal C1.

The volume of information of threshold chain code signal C2 is smoothed by the buffer memory 6 and becomes output signal C3 of the structure extraction coding device 70. Then, the output signal C3 is recorded in an optical disc, a magneto-optical disc, or semiconductor memory via an error correction circuit and a modulation circuit which are not shown. Or, the output signal C3 is outputted to a transmission line 8 via an error correction circuit and a modulation circuit which are not shown.

The buffer capacity calculation circuit 72 calculates the feedback parameter from the amount of contents in the buffer and outputs this as threshold parameter signal C1.

In the case where the structure extraction coding device 70 conducts the chain thresholding only by the thresholding parameter T of the length of chain (e.g., in the case where the chain threshold circuit 71 is constructed as shown in FIG. 15), the more the amount of contents in buffer increases, the more the value of thresholding level T would be increased and the number of chains to be eliminated will be increased.

On the other hand, in the case where the chain thresholding is conducted two-dimensionally according to the length of chain and the average edge intensity of the chain (e.g., the chain threshold circuit 71 is constructed as shown in FIG. 19), the more the amount of contents in buffer increases, the more the value of scale parameter S would be increased and the number of chains to be removed is increased by the structure extraction coding device 70.

According to the structure extraction coding device 70, since the number of chains to be eliminated is increased or decreased corresponding to the quantity of codes of threshold chain code signal C2, unnecessary branch chains eliminating process can be shifted properly according to pictures.

Further, the construction of the other structure extraction coding device according to this invention will be described below.

Figure 23:
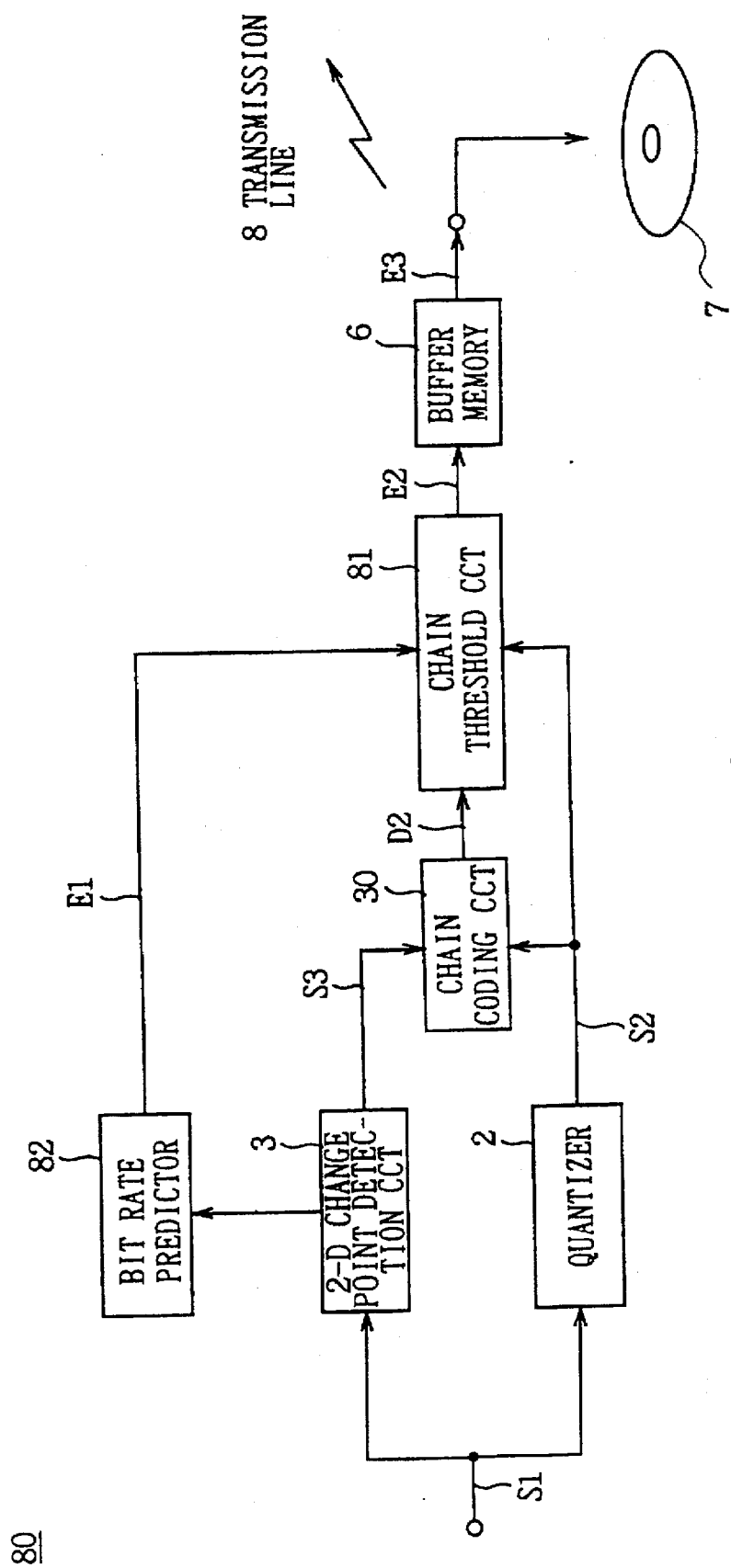

FIG. 23 is a block diagram showing the construction of other structure extraction coding device 80 of this invention. The parts corresponding to FIG. 10 in each part of the structure extraction coding device 80 are given the same reference numerals, and the explanation is omitted. The structure extraction coding device 80 applies the chain coding circuit 30 (FIG. 10 and FIG. 11) described above.

The structure extraction coding device 80 gives chain code signal D2 from the chain coding circuit 30 to a chain threshold circuit 81, and simultaneously gives quantized coefficient signal S2 from the quantizer 2 to the chain threshold circuit 81.

In addition to the above, the structure extraction coding device 80 supplies threshold parameter signal E1 which is output from a bit rate predictor 82 to the chain threshold circuit 81.

The chain threshold circuit 81 generates threshold chain code signal E2 by conducting thresholding on only the length of chain, or the length of chain and the average edge intensity of chain of chain code signal D2 in utilizing threshold parameter signal E1.

The volume of information of threshold chain code signal E2 is smoothed by the buffer memory 6 and becomes output signal E3 of the structure extraction coding device 80. Then, the output signal E3 is recorded in an optical disc, a magneto-optical disc, or semiconductor memory via an error correction circuit and a modulation circuit which are not shown. Or, the output signal E3 is outputted to a transmission line 8 via an error correction circuit and a modulation circuit which are not shown.

The bit rate predictor 82 predicts the generation bit rate from the sum of feature points detected depending on the output of two-dimensional change point detection circuit 3 and the sum of feature points having only one neighboring feature point in the feature points detected. And then, the bit rate predictor 82 calculates the feedforward parameter from the predicted bit rate and outputs this as threshold parameter signal E1.

In this connection, in the case where the sum of detected feature points is A and the sum of feature points having one neighboring feature point in the feature points detected is B, the generation bit rate P can be calculated by the following equation:

$$P = 5 \times A + 1.2 \times B \tag{2}$$

At this point, in the case where the structure extraction coding device 80 conducts the chain thresholding only by the thresholding parameter T of the length of chain (e.g., in the case where the chain threshold circuit 81 is constructed as shown in FIG. 15), the more the predicted generation bit rate increases, the more the value of thresholding level will be increased and the number of chains to be eliminated will be increased.

On the other hand, at the time when the chain thresholding is conducted two-dimensionally by the length of chain and the average edge intensity of chain (e.g., in the case where the chain threshold circuit 81 is constructed as shown in FIG. 19), the more the bit rate increases, the more the scale parameter S will be increased and the number of chains to be eliminated will be increased by the structure extraction coding device 80.

With this arrangement, according to the structure extraction coding device 80, since the number of chains to be eliminated is increased or decreased depending on the feature amount of feature points contained in input image signal S1, the eliminating process of unnecessary branch chains can be properly shifted according to pictures.

According to the present invention, in addition to the chain thresholding process of the embodiment described above, the chain thresholding can be conducted sequentially by the length of chains in order of increasing length starting from the short chain, or the chain thresholding can be conducted by the average edge intensity of chain in order of increasing intensity from the chain having weaker intensity.

Moreover, according to the present invention, in the case where multiple number of feature point chains having no branch point in chain is branched off at one branch point, the priority order of each chain after branched is determined supposing that the chain of the smaller amplitude value difference before and after the branch has the high priority order, depending on the amplitude value of each chain before the branch and the amplitude value of each chain after the branch, and the thresholding can be conducted from the chain having the lower priority order in order of increasing priority.

With this arrangement, chains of which amplitude value differs greatly in front and rear of the branch point such as noise chains can be eliminated, and as a result, more accurate chain eliminating process can be conducted according to the importance of the chains.

According to the present invention as described above, the feature point chains are represented by the tree structure, so that the object contours branched off can be coded with small quantity of codes and thereby coding efficiency can be improved.

Furthermore, according to the present invention, feature point chains are represented by the tree structure and chains having no branch point in the inside become the objects of the thresholding, so that noise elements can be effectively eliminated without cutting off the feature point chain showing the object contour. As a result, coding efficiency can be improved.

While there has been described in connection with the preferred embodiments of the invention, it will be obvious to those skilled in the art that various changes and modifications may be aimed, therefore to cover in the appended claims all such changes and modifications as fall within the true spirit and scope of the invention.

HP Case No. 10950131-1

Appendix A

Resizing trixels

This contains two routines, one to expand a horizontal (printer) line (Line_expand) and one to interpolate between video lines(Line_maker). Landscape mode is handled by reading the video image in memory in such a way as to convert the video lines from horizontal to vertical orientation.

The resizer works by interpolating lines first then resizing the line. Here video line refers to a color corrected line of video length(640, 320 or 160 trixels in portrait mode or 480, 240 or 120 in landscape mode) in the CMY trixel format.

Line_maker

Input:

Point_in_A       Pointer to upper line of video trixel data to be
                 interpolated.

Point_in_B       Pointer to lower line of video trixel data to be
                 interpolated.

Point_out        Pointer to the storage location for the new video
                 trixel line.

R_factor_y       A 32 bit number with 12 bits of integer and 20
                 bits of fraction.
                 =(in_line-1)/(out_line-)X0x00001000.
                 If in_line > out_line the image will be reduced.
                 If in_line < out_line the image will be expanded.

Line_length      A 16 bit number = the length of the input line
                 -1.

Internal:

d5               A 32 bit mask 0xFF9FF3FE
d6               A 32 bit number for rounding compensation
                 0x400801

Index_y          A 32 bit number of the same format as R_factor_y.

```
lines   addl R_factor_y,Index_y
        movel Index_y,d0        ;copy index
        swap d0                 ;
        moveq #0x0F,d2          ;mask for chuter
        andb d0,d2              ;4 MSBs of fractional part are
now in D2
        subb d2,d0              ;I bits now alone in D0
        lsrl #2,d0              ;Index for long words
```

-1-

HP Case No. 10950131-1

If a new line A and/or B is required, call the CC routine

```
       movel Point_in_A,a0
       movel Point_in_B,a1
       movel Point_out,a2
       movew Line_length,d0
``` lend   This line is finished- send it to the line expand.

```
       jmp 2(PC,d1)              ;jump table
       braw lcase1
       braw lcase2
       braw lcase3
       braw lcase4
       braw lcase5
       braw lcase6
       braw lcase7
       braw lcase8
       braw lcase9
       braw lcase10
       braw lcase11
       braw lcase12
       braw lcase13
       braw lcase14
       braw lcase15 lcase1 movel (a0)+,d1            ;get one from upper line
       movel (a1)+,d4            ;get one from lower line
       addl d1,d4
       addl d6,d4
       andl d5,d4
       lsrl #1,d4
       addl d1,d4
       addl d6,d4
       andl d5,d4
       lsrl #1,d4
       addl d4,d1
       addl d6,d1
       andl d5,d1
       lsrl #1,d1
       addl d4,d1
       addl d6,d1
       andl d5,d1
       lsrl #1,d1
       movel d4,(a2)+            ;put the result away
       dbcc d0,lcase1            ;if this isn't the last one, do
                                  again
       bra lend                  ;if it is, line is finished, goto
                                  lend
```

-2-

HP Case No. 10950131-1

```
lcase2    movel (a0)+,d1          ;get one from upper line
          movel (a1)+,d4          ;get one from lower line
          addl d1,d4
          addl d6,d4
          andl d5,d4
          lsrl #1,d4
          addl d1,d4
          addl d6,d4
          andl d5,d4
          lsrl #1,d4
          addl d4,d1
          addl d6,d1
          andl d5,d1
          lsrl #1,d1
          movel d4,(a2)+          ;put the result away
          dbcc d0,lcase2          ;if this isn't the last one, do
                                   again
          bra lend                ;if it is, line is finished, goto
                                   lend lcase3    movel (a0)+,d1          ;get one from upper line
          movel (a1)+,d4          ;get one from lower line
          addl d1,d4
          addl d6,d4
          andl d5,d4
          lsrl #1,d4
          addl d1,d4
          addl d6,d4
          andl d5,d4
          lsrl #1,d4
          addl d4,d1
          addl d6,d1
          andl d5,d1
          lsrl #1,d1
          addl d4,d1
          addl d6,d1
          andl d5,d1
          lsrl #1,d1
          movel d4,(a2)+          ;put the result away
          dbcc d0,lcase3          ;if this isn't the last one, do
                                   again
          bra lend                ;if it is, line is finished, goto
                                   lend lcase4    movel (a0)+,d1          ;get one from upper line
          movel (a1)+,d4          ;get one from lower line
          addl d1,d4
          addl d6,d4
          andl d5,d4
          lsrl #1,d4
          addl d4,d1
          addl d6,d1
          andl d5,d1
          lsrl #1,d1
```

-3-

HP Case No. 10950131-1

```
           movel d4,(a2)+           ;put the result away
           dbcc d0,lcase4           ;if this isn't the last one, do
                                     again
           bra lend                 ;if it is, line is finished, goto
                                     lend lcase5     movel (a0)+,d1           ;get one from upper line
           movel (a1)+,d4           ;get one from lower line
           addl d1,d4
           addl d6,d4
           andl d5,d4
           lsrl #1,d4
           addl d4,d1
           addl d6,d1
           andl d5,d1
           lsrl #1,d1
           addl d1,d4
           addl d6,d4
           andl d5,d4
           lsrl #1,d4
           addl d4,d1
           addl d6,d1
           andl d5,d1
           lsrl #1,d1
           movel d4,(a2)+           ;put the result away
           dbcc d0,lcase5           ;if this isn't the last one, do
                                     again
           bra lend                 ;if it is, line is finished, goto
                                     lend lcase6     movel (a0)+,d1           ;get one from upper line
           movel (a1)+,d4           ;get one from lower line
           addl d1,d4
           addl d6,d4
           andl d5,d4
           lsrl #1,d4
           addl d4,d1
           addl d6,d4
           andl d5,d1
           lsrl #1,d1
           addl d4,d1
           addl d6,d1
           andl d5,d1
           lsrl #1,d1
           movel d4,(a2)+           ;put the result away
           dbcc d0,lcase6           ;if this isn't the last one, do
                                     again
           bra lend                 ;if it is, line is finished, goto
                                     lend lcase7     movel (a0)+,d1           ;get one from upper line
           movel (a1)+,d4           ;get one from lower line
           addl d1,d4
           addl d6,d4
```

-4-

HP Case No. 10950131-1

```
               andl d5,d4
               lsrl #1,d4
               addl d4,d1
               addl d6,d1
               andl d5,d1
               lsrl #1,d1
               addl d4,d1
               addl d6,d1
               andl d5,d1
               lsrl #1,d1
               addl d4,d1
               addl d6,d1
               andl d5,d1
               lsrl #1,d1
               movel d4,(a2)+            ;put the result away
               dbcc d0,lcase7            ;if this isn't the last one, do
                                          again
               bra lend                  ;if it is, line is finished, goto
                                          lend lcase8     movel (a0)+,d1            ;get one from upper line
               movel (a1)+,d4            ;get one from lower line
               addl d4,d1
               addl d6,d1
               andl d5,d1
               lsrl #1,d1
               movel d4,(a2)+            ;put the result away
               dbcc d0,lcase8            ;if this isn't the last one, do
                                          again
               bra lend                  ;if it is, line is finished, goto
                                          lend lcase9     movel (a0)+,d4            ;get one from upper line
               movel (a1)+,d1            ;get one from lower line
               addl d1,d4
               addl d6,d4
               andl d5,d4
               lsrl #1,d4
               addl d4,d1
               addl d6,d1
               andl d5,d1
               lsrl #1,d1
               addl d4,d1
               addl d6,d1
               andl d5,d1
               lsrl #1,d1
               addl d4,d1
               addl d6,d1
               andl d5,d1
               lsrl #1,d1
               movel d4,(a2)+            ;put the result away
               dbcc d0,lcase9            ;if this isn't the last one, do
                                          again
               bra lend                  ;if it is, line is finished, goto
```

HP Case No. 10950131-1

```
                lend lcase10  movel (a0)+,d4        ;get one from upper line
         movel (a1)+,d1        ;get one from lower line
         addl d1,d4
         addl d6,d4
         andl d5,d4
         lsrl #1,d4
         addl d4,d1
         addl d6,d4
         andl d5,d1
         lsrl #1,d1
         addl d4,d1
         addl d6,d1
         andl d5,d1
         lsrl #1,d1
         movel d4,(a2)+        ;put the result away
         dbcc d0,lcase10       ;if this isn't the last one, do
                                again
         bra lend              ;if it is, line is finished, goto
                                lend lcase11  movel (a0)+,d4        ;get one from upper line
         movel (a1)+,d1        ;get one from lower line
         addl d1,d4
         addl d6,d4
         andl d5,d4
         lsrl #1,d4
         addl d4,d1
         addl d6,d1
         andl d5,d1
         lsrl #1,d1
         addl d1,d4
         addl d6,d4
         andl d5,d4
         lsrl #1,d4
         addl d4,d1
         addl d6,d1
         andl d5,d1
         lsrl #1,d1
         movel d4,(a2)+        ;put the result away
         dbcc d0,lcase11       ;if this isn't the last one, do
                                again
         bra lend              ;if it is, line is finished, goto
                                lend lcase12  movel (a0)+,d4        ;get one from upper line
         movel (a1)+,d1        ;get one from lower line
         addl d1,d4
         addl d6,d4
         andl d5,d4
         lsrl #1,d4
         addl d4,d1
         addl d6,d1
```

-6-

HP Case No. 10950131-1

```
        andl d5,d1
        lsrl #1,d1
        movel d4,(a2)+          ;put the result away
        dbcc d0,lcase12         ;if this isn't the last one, do
                                 again
        bra lend                ;if it is, line is finished, goto
                                 lend lcase13 movel (a0)+,d4          ;get one from upper line
        movel (a1)+,d1          ;get one from lower line
        addl d1,d4
        addl d6,d4
        andl d5,d4
        lsrl #1,d4
        addl d1,d4
        addl d6,d4
        andl d5,d4
        lsrl #1,d4
        addl d4,d1
        addl d6,d1
        andl d5,d1
        lsrl #1,d1
        addl d4,d1
        addl d6,d1
        andl d5,d1
        lsrl #1,d1
        movel d4,(a2)+          ;put the result away
        dbcc d0,lcase13         ;if this isn't the last one, do
                                 again
        bra lend                ;if it is, line is finished, goto
                                 lend lcase14 movel (a0)+,d4          ;get one from upper line
        movel (a1)+,d1          ;get one from lower line
        addl d1,d4
        addl d6,d4
        andl d5,d4
        lsrl #1,d4
        addl d1,d4
        addl d6,d4
        andl d5,d4
        lsrl #1,d4
        addl d4,d1
        addl d6,d1
        andl d5,d1
        lsrl #1,d1
        movel d4,(a2)+          ;put the result away
        dbcc d0,lcase14         ;if this isn't the last one, do
                                 again
        bra lend                ;if it is, line is finished, goto
                                 lend lcase15 movel (a0)+,d4          ;get one from upper line
        movel (a1)+,d1          ;get one from lower line
```

-7-

HP Case No. 10950131-1

```
addl d1,d4
addl d6,d4
andl d5,d4
lsrl #1,d4
addl d1,d4
addl d6,d4
andl d5,d4
lsrl #1,d4
addl d4,d1
addl d6,d1
andl d5,d1
lsrl #1,d1
addl d4,d1
addl d6,d1
andl d5,d1
lsrl #1,d1
movel d4,(a2)+          ;put the result away
dbcc d0,lcase15         ;if this isn't the last one, do
                            again
bra lend                ;if it is, line is finished, goto
                            lend
```

HP Case No. 10950131-1

Appendix B

This example uses the symmetrical nature of the "chute" process
to reduce code size.

Line_expand:

Input:

Point_in         A pointer to the line of video trixel data to be
                 resized.

Point_out        A pointer to the storage location for the resized
                 trixel data.

R_factor_x       A 32 bit number with 12 bits of integer and 20
                 bits of fraction.
                 =(in_trix-1)/(out_trix-)X0x00001000.
                 If in_trix > out_trix the image will be reduced.
                 If in_trix < out_trix the image will be expanded.

Stop_trix        A 16 bit number = the number of input trixels
                 times 4.

Internal:

d5            A 32 bit mask 0xFF9FF3FE
   d6            A 32 bit number for rounding compensation
                 0x400801

Index_x          A 32 bit number of the same format as R_factor_x.

Set up registers and:
        bra first
end     this line is finished, get on with your life case 12
        exg   d1,d4
case 4
        addl  d1,d4
        addl  d6,d4
        andl  d5,d4
        lsrl  #1,d4
case 8
        addl  d4,d1
        addl  d6,d1
        andl  d5,d1
        lsrl  #1,d1

-1-

HP Case No. 10950131-1

```
again    addl R_factor_x,Index_x  ;one increment
first    movel Index_x,d0         ;copy index
         swap d0                  ;
         moveq #0x0F,d2           ;mask for chuter
         andb d0,d2               ;4 MSBs of fractional part are
                                   now in D2
         subb d2,d0               ;I bits now alone in D0
         lsrl #2,d0               ;Index for long words
         moveal Point_in,a0
         adda d0,a0               ;points to next trixel
         move (a0)+,d1            ;get it
         move (a0),d4             ;get the next one too
         jmp 2(PC,d1)             ;jump table
         braw case0
         braw case1
         braw case2
         braw case3
         braw case4
         braw case5
         braw case6
         braw case7
         braw case8
         braw case9
         braw case10
         braw case11
         braw case12
         braw case13
         braw case14
         braw case15 case0    movel d1,(Point_out)+    ;one trixel into output buffer
         cmpl Stop_trix,d0
         bcc GE,end               ;if that was the last trixel
go
                                   to end
         bra again                ;if not, keep going case 15
         exg  d1,d4
case 1
         addl d1,d4
         addl d6,d4
         andl d5,d4
         lsrl #1,d4
         addl d1,d4
         addl d6,d4
         andl d5,d4
         lsrl #1,d4
         bra case 4 case 14
         exg  d1,d4
```

-2-

HP Case No. 10950131-1

```
case 2
        addl    d1,d4
        addl    d6,d4
        andl    d5,d4
        lsrl    #1,d4
        bra case 4
case 13
        exg     d1,d4
case 3
        addl    d1,d4
        addl    d6,d4
        andl    d5,d4
        lsrl    #1,d4
        addl    d1,d4
        addl    d6,d4
        andl    d5,d4
        lsrl    #1,d4
        addl    d4,d1
        addl    d6,d1
        andl    d5,d1
        lsrl    #1,d1
        bra case 8 case 11
        exg     d1,d4
case 5
        addl    d1,d4
        addl    d6,d4
        andl    d5,d4
        lsrl    #1,d4
        addl    d4,d1
        addl    d6,d1
        andl    d5,d1
        lsrl    #1,d1
        bra case 4 case 10
        exg     d1,d4
case 6
        addl    d1,d4
        addl    d6,d4
        andl    d5,d4
        lsrl    #1,d4
        addl    d4,d1
        addl    d6,d4
        andl    d5,d1
        lsrl    #1,d1
        bra case 8 case 9
        exg     d1,d4
case 7
```

-3-

```
addl d1,d4
addl d6,d4
andl d5,d4
lsrl #1,d4
addl d4,d1
addl d6,d1
andl d5,d1
lsrl #1,d1
addl d4,d1
addl d6,d1
andl d5,d1
lsrl #1,d1
bra case 8
```

What is claimed is:

1. A video signal coding method for coding an input video signal, comprising the steps of:

detecting feature points of said input video signal;

chain coding feature amount and coordinates of said feature points, to generate a chain of chain codes;

multiplexing a branch code representing a branch part at which the part to be branched occurs on said chain of chain codes in order to chain code said feature points as said chain;

obtaining a respective index value for each chain with respect to feature point chains having no branch point in the chain generated by said multiplexing step;

comparing said index value with a fixed threshold value; and eliminating the branch code and following chain codes of the chain whose index value is lower than the threshold value.

2. The video signal coding method according to claim 1, wherein said eliminating step sets said threshold value depending on a feedback parameter calculated from an occupied amount of a buffer which temporarily stores the remaining uneliminated chain codes.

3. The video signal coding method according to claim 1, wherein said eliminating step sets said threshold value depending on a feedforward parameter calculated from the detected feature points of said input video signal.

4. The video signal coding method according to claim 1, wherein said eliminating step, in the case where plural feature point chains having no branch point therein are branched off from one branch point, determines priority order of each chain after being branched in accordance with amplitude values of the chain before and after being branched, and wherein said eliminating step is conducted in order of increasing priority from the chain having the lowest priority order.

5. The video signal coding method according to claim 1, wherein said eliminating step is repeated.

6. The video signal coding method according to claim 1, wherein said eliminating step uses multiple index values as the index value of every chain.

7. The video signal coding method according to claim 6, wherein said eliminating step sets said threshold value depending on a feedback parameter calculated from an occupied amount of a buffer which temporarily stores the remaining uneliminated chain codes.

8. The video signal coding method according to claim 6, wherein said eliminating step sets said threshold value depending on a feedforward parameter calculated from the detected feature points of said input video signal.

9. A video signal coding apparatus for coding input video signal, comprising:

means for detecting feature points of said input video signal;

means for chain coding feature amount and coordinates of said feature points, to generate a chain of chain codes;

means for multiplexing a branch code representing a branch part at which the part to be branched occurs on said chain of chain codes in order to chain code said feature points as said chain:

means for obtaining a respective index value for each chain with respect to feature point chains having no branch point in the chain generated by said multiplexing means;

means for comparing said index value with a fixed threshold value; and means for eliminating the branch code and following chain code of the chain whose index value is lower than the threshold value.

10. The video signal coding apparatus according to claim 9, wherein said eliminating means sets said threshold value depending on a feedback parameter calculated from an occupied amount of a buffer which temporarily stores the remaining uneliminated chain codes.

11. The video signal coding apparatus according to claim 9, wherein said eliminating means sets said threshold value depending on a feedforward parameter calculated from the detected feature points of said input video signal.

12. The video signal coding apparatus according to claim 9, wherein said eliminating means, in the case where plural feature point chains having no branch point therein are branched off from one branch point, determines priority order of each chain after being branched in accordance with amplitude values of the chain before and after being branched, and which said eliminating means operate in order of increasing priority from the chain having the lowest priority order.

13. The video signal coding apparatus according to claim 9, wherein said eliminating means operates repeatedly.

14. The video signal coding apparatus according to claim 9, wherein said eliminating means uses multiple index values as the index value of every chain.

15. The video signal coding apparatus according to claim 14, wherein said eliminating means sets said threshold value depending on a feedback parameter calculated from an occupied amount of a buffer which temporarily stores the remaining uneliminated chain codes.

16. The video signal coding apparatus according to claim 14, wherein said eliminating means sets said threshold value depending on a feedforward parameter calculated from the detected feature points of said input video signal.

* * * * *